US010826375B2

(12) United States Patent
Wang et al.

(10) Patent No.: US 10,826,375 B2
(45) Date of Patent: Nov. 3, 2020

(54) FREQUENCY JITTER FOR A POWER CONVERTER

(71) Applicant: Power Integrations, Inc., San Jose, CA (US)

(72) Inventors: Zhao-Jun Wang, San Jose, CA (US); Sundaresan Sundararaj, Union City, CA (US); Tiziano Pastore, Los Gatos, CA (US); Qing McIntosh, Los Gatos, CA (US); Lance M. Wong, Milpitas, CA (US)

(73) Assignee: Power Integrations, Inc., San Jose, CA (US)

( * ) Notice: Subject to any disclaimer, the term of this patent is extended or adjusted under 35 U.S.C. 154(b) by 23 days.

(21) Appl. No.: 16/216,611

(22) Filed: Dec. 11, 2018

(65) Prior Publication Data

US 2020/0186021 A1    Jun. 11, 2020

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33523* (2013.01); *H02M 2001/0003* (2013.01)

(58) Field of Classification Search
None
See application file for complete search history.

(56) References Cited

U.S. PATENT DOCUMENTS

| 6,107,851 | A | 8/2000 | Balakirshnan |
| 6,229,366 | B1 | 5/2001 | Balakirshnan et al. |
| 6,249,876 | B1 | 6/2001 | Balakrishnan et al. |
| 8,368,370 | B2 | 2/2013 | Moorish |
| 9,774,248 | B2 | 9/2017 | Saint-Pierre et al. |
| 10,033,284 | B2 | 7/2018 | Werner et al. |
| 10,088,854 | B2 | 10/2018 | Pham et al. |
| 10,135,343 | B2 | 11/2018 | Djenguerian et al. |
| 2012/0300499 | A1* | 11/2012 | Chang ..................... H02M 1/36 363/16 |
| 2018/0083540 | A1 | 3/2018 | Pham et al. |
| 2018/0358902 | A1* | 12/2018 | Duvnjak ........... H02M 3/33592 |

* cited by examiner

*Primary Examiner* — Nguyen Tran
(74) *Attorney, Agent, or Firm* — Pamela Lau Kee

(57) ABSTRACT

A controller for use in a power converter comprising a request control circuit coupled to receive a feedback signal representative of an output of the power converter. The request control circuit is coupled to generate a request signal for controlling a power switch. The request signal can include a synchronization signal in response to the feedback signal and a jitter average signal. The synchronization signal is generated by the request transmitter circuit and corresponds to an average on time for controlling the power switch.

33 Claims, 13 Drawing Sheets

FREQUENCY JITTER FOR A POWER CONVERTER

BACKGROUND INFORMATION

Field of the Disclosure

The present invention relates generally to power converters, and more specifically providing a jitter signal to vary a switching frequency of a power switch in a power converter controller.

Background

In a typical switched-mode power supply application, an ac-dc power supply receives an input that is nominally between 100 and 277 volts rms (root mean square) from a utility power source. The ac input voltage varies as a sinusoid with a period corresponding to a frequency that is nominally either 50 Hz or 60 Hz in different regions of the world. Switches in the power supply are switched on and off by a control circuit at a rate that is typically more than one thousand times greater than the frequency of the ac input voltage to provide a regulated output that may be suitable for providing current to, for example, a light emitting diode (LED) load for illumination. Although LED loads will predominantly be used as example loads in this disclosure, it is appreciated that there are many other types of loads that require either a constant voltage or a constant current or constant power or a combination of both constant voltage and constant current output characteristic—such as, for example, batteries in mobile electronics products that could benefit from the teachings of the present invention. In typical applications, variations in the constant output voltage or constant output current caused by changes in load, temperature, or input voltage are undesirable. It is desired to have a regulated output so that the voltage or current that is being regulated remains relatively constant relative to changes in load, input voltage, temperature, etc. In the case of an LED load, constant current output is desired to ensure that the LEDs provide illumination at a relatively constant intensity. With a relatively constant output current, the ac-dc power supply provides relatively constant output power to the LED load as the voltage across the LED string would be relatively constant. Since the ac input voltage will not naturally provide energy at a constant rate during a sinusoidal ac line period, the power supply must have an energy storage capability that allows it to take energy from the input at a non-constant rate and deliver it to the output at a constant rate. Typically, the energy is stored as the rectified input voltage on a storage capacitor at the input to the power conversion stage. However, in this configuration the storage capacitor draws most of its current from the ac input at the peak of the ac voltage, increasing the rms input current and generating line frequency harmonics that are undesirable in many applications.

An ac-dc power supply that provides regulated current to LEDs typically must meet requirements for power factor, efficiency, and possibly galvanic isolation as explained below. Designers are challenged to provide satisfactory solutions at the lowest cost.

The utility power source provides an ac voltage that has a waveform conforming to standards of magnitude, frequency, and harmonic content to an electrical outlet. The current drawn from the outlet, however, is determined by the characteristics of the power supply that receives the ac voltage. An ideal current waveform will match the waveform of the voltage from the outlet, and the two will cross zero at the same time. In other words, the waveform of the ideal input current will be proportional to the waveform of the input voltage. A measure of how closely the current drawn from the outlet matches the ac voltage waveform is power factor. In any complete period of the ac input voltage, the ideal current will have an rms value that is equal to the value of the average power from the outlet divided by the rms value of the voltage. A power factor of 100% is ideal. In other words, the product of the rms voltage and the rms current will be equal to the power from the outlet when the current has ideal characteristics. Power supplies for LEDs, for example, typically must include power factor correction to meet regulatory requirements. A power supply that does not include power factor correction might have a power factor less than 50%, whereas a power factor greater than 90% is typically required to meet the standards for input current.

Safety agencies generally require the power supply to provide galvanic isolation between input and output. Galvanic isolation prevents dc current between input and output of the power supply. In other words, a high dc voltage applied between an input terminal and an output terminal of a power supply with galvanic isolation will produce substantially no dc current between the input terminal and the output terminal of the power supply. The requirement for galvanic isolation is a complication that contributes to the cost of the power supply.

A power supply with galvanic isolation must maintain an isolation barrier that electrically separates the input from the output. Energy must be transferred across the isolation barrier to provide power to the output, and information in the form of feedback signals in many cases is transferred across the isolation barrier to regulate the output. Galvanic isolation is typically achieved with electromagnetic and electro-optical devices. Electromagnetic devices such as transformers and coupled inductors are generally used to transfer energy between input and output to provide output power, whereas either electro-optical devices or electromagnetic devices may be used to transfer signals between output and input to control the transfer of energy between input and output.

A common solution to achieve high power factor for an ac-dc power supply with galvanic isolation uses two stages of power conversion: One stage without a storage capacitor at its input and without galvanic isolation is configured to shape the ac input current to maintain a high power factor, providing an intermediate output voltage across a storage capacitor. The intermediate output voltage is a dc voltage greater than the rectified ac input voltage. The intermediate voltage on the storage capacitor may be hundreds of volts. The intermediate output is the input to a second stage of power conversion that has galvanic isolation and control circuitry to regulate a final output. The output of the first stage typically stores the non-constant energy from the input in the storage capacitor, and then provides the energy to the second stage for delivery at a constant rate to the output. The use of more than one stage of power conversion with high voltage energy storage increases the cost and complexity of the power supply.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A power converter controller can regulate the output of the power converter. The power converter controller can include a secondary controller that is coupled to communicate the desired switching frequency of a power switch for controlling the transfer of energy from the input of the power converter to the output of the power converter. One way to reduce electromagnetic interference (EMI) appearing on the fundamental/harmonics in a power converter is to spread the energy out to other frequencies by varying the switching frequency, aka frequency jitter. The jittering of the switching frequency can cause a variation of the switching frequency, but the average switching frequency can remain the same. In one example, the jittering of the switching frequency can vary the switching frequency from plus or minus five percent. The secondary controller can provide a jittered switching frequency with a request signal, and also communicate the average switching frequency with a synchronization signal.

Figure 1:
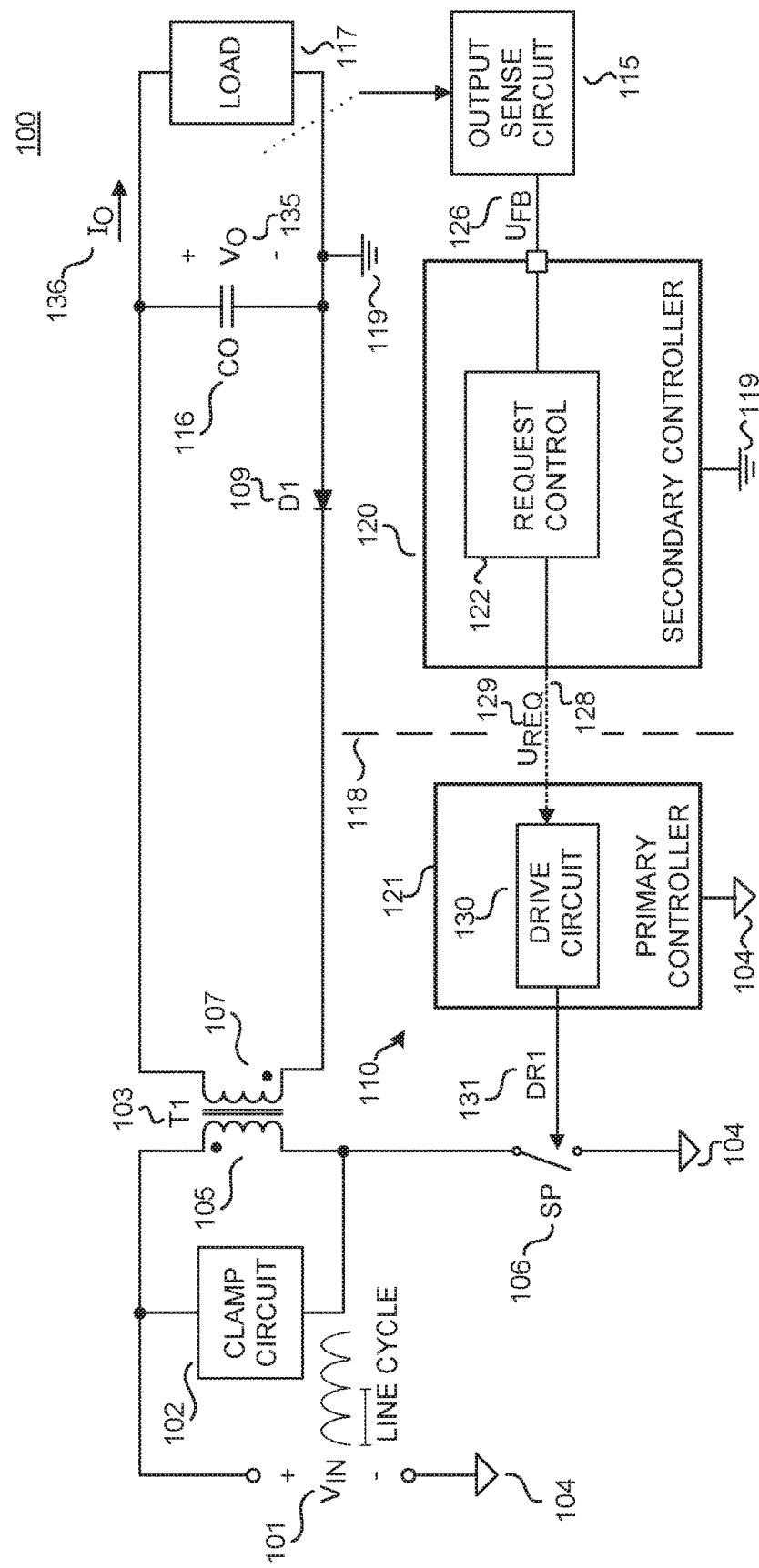
FIG. 1 illustrates a schematic block diagram that illustrates an example power converter that receives an input voltage to produce an output voltage and an output current and is regulated by a primary and secondary controller in accordance with the teachings of the present invention.

To illustrate, FIG. 1 is a schematic block diagram illustrating an example switched mode power converter 100 and a power converter controller 110 in accordance with an embodiment of the disclosure. In one example, the power converter 100 provides output power to the load 117 from an unregulated input voltage $V_{IN}$ 101, which in one example is a rectified ac line voltage or a rectified and filtered ac line voltage. In the depicted example, the input voltage $V_{IN}$ 101 is a full wave rectified voltage having a line cycle, which includes two half line cycles of an ac input voltage waveform. In one example, the ac input voltage waveform may be received from a varying ac line, and the power converter 100 is a power factor corrected (PR) power converter. The input voltage $V_{IN}$ 101 is coupled to the energy transfer element 103. In some embodiments, the energy transfer element 103 may be a coupled inductor, transformer, or an inductor. The example energy transfer element 103 shown in FIG. 1 includes two windings, a primary winding 105 and a secondary winding 107. However, in other examples, the energy transfer element 103 may have more than or less than two windings. Coupled across the primary winding 105 is the clamp circuit 102, which limits the maximum voltage across a power switch SP 106 that is coupled to the primary winding 105 and an input return 104 as shown.

The secondary winding 107 is coupled to the output rectifier D1 109, which in the depicted example is shown as a diode. However, in another example, it is appreciated that the output rectifier D1 109 may be substituted with a transistor used as a synchronous rectifier. An output capacitor CO 116 is shown as being coupled to the output rectifier D1 109 and output return 119. As will be discussed, the power converter 100 further includes a controller 110 to regulate the output of power converter 100. In general, the output of the power converter 100 is an output voltage $V_O$ 135, an output current $I_O$ 136, or a combination of the two. An output sense circuit 115 is coupled to sense the output of the power converter 100 to provide the feedback signal $U_{FB}$ 126. The feedback signal $U_{FB}$ 126 may be representative of the output voltage $V_O$ 135, an output current $I_O$ 136, or a combination of the two.

In the illustrated example, the power converter 100 is shown as having a flyback topology. It is appreciated that other known topologies and configurations of power converters may also benefit from the teachings of the present disclosure. In the depicted example, the input of power converter 100 is galvanically isolated from the output of power converter 100, such that input return 104 is galvanically isolated from output return 119, further illustrated by the dashed line 118. Since the input and output of power converter 100 are galvanically isolated, there is no direct current (dc) path across the isolation barrier of energy transfer element T1 103, or between primary winding 105 and secondary winding 107, or between input return 104 and output return 119. However, it should be appreciated that non-isolated converter topologies may benefit from the teachings of the present disclosure.

As shown in the depicted example, power converter 100 includes a power converter controller 110. The power converter controller 110 can include a primary controller 121 and a secondary controller 120. The secondary controller 120 is coupled to receive the feedback signal $U_{FB}$ 126. The primary controller 121 is coupled to generate the drive signal DR1 131 in response to the feedback signal $U_{FB}$ 126. The drive signal DR1 131 controls the turn on and turn off of the power switch SP 106. In one example, the drive signal DR1 131 is a rectangular pulse waveform with varying durations of logic high and logic low sections. In one example, a logic high value in the drive signal DR1 131 turns on the power switch SP 106 while a logic low value turns off the power switch SP 106. The duration of the logic high section may be referred to as the on-time of the power switch SP 106 while the duration of the logic low sections may be referred to as the off-time of the power switch SP 106. Further, the sum of the on-time and the off-time may be referred to as the switching period, which is the inverse of the switching frequency.

To regulate the output provided to the load 117, the power converter controller 122 may vary one or more switching parameters of the power switch SP 106. Example parameters may include the on-time, off-time, and switching frequency/switching period. The various values which the power converter controller 110 may choose for the switching parameters may be referred to as the operational states. In one example, the power converter controller 110 may control the switching frequency and the on-time of power switch SP 106 and the various values for the switching frequency and on-time may be the operational states. As will be further discussed, the power converter controller 110 may increase the switching frequency of the power switch SP 106 to deliver more energy to the load 117, Further, increased switching frequency may correspond with larger on-times for the power switch SP 106.

The secondary controller 120 can jitter the switching frequency, which can be communicated across the communication link 128 to the primary controller 120. The secondary controller 120 includes a request control 122 coupled to receive the feedback signal $U_{FB}$ 126 and outputs the request signal $U_{REQ}$ 129. The request signal $UR_{REQ}$ 129 may also be referred to as request events or enable events that are generated in response to the feedback signal $U_{FB}$ 126 to a target value and indicates that the primary controller 121 should turn on the power switch SP 106. The request signal $U_{REQ}$ 129 may be a rectangular pulse waveform which pulses to a logic high value and quickly returns to a logic low value. The logic high pulses may be referred to as request events. The time between leading edges of the request events (or trailing edges) may be referred to as the request period $T_{REQ}$ and the request frequency $f_{REQ}$ is the reciprocal of the request period $T_{REQ}$. The request frequency $f_{REQ}$ (and ergo the request period $T_{REQ}$) of the request signals may be responsive to the feedback signal $U_{FB}$ 126. In one example, the request frequency $f_{REQ}$ increases if the feedback signal is less than the target value and decreases if feedback signal is greater than the target value.

Drive circuit 130 is coupled to receive the request signal $U_{REQ}$ 129 through a communication link 128. In the example shown, the drive circuit 130 is coupled to turn on the power switch SP 106 in response to the request signal 129. In particular, the drive circuit 130 is coupled to generate the drive signal DR1 131 in response to the request signal $U_{REQ}$ 129, which is coupled to control switching of the power switch SP 106 to control the transfer of energy from an input to an output of the power converter. For example, the drive circuit 130 may transition the drive signal DR1 131 to a logic high value (to turn on power switch SP 106) in response to a received enable events.

It is generally understood that a switch that is closed may conduct current and is considered on, while a switch that is open cannot conduct current and is considered off. In one example, the power switch SP 106 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT). The frequency of the request signals 129 (i.e., $f_{REQ}$) sets the switching frequency of the power switch SP 106. Further, the request frequency $f_{REQ}$ may determine the on-time of the power switch SP 106. The drive circuit 130 may include a frequency to on-time converter to translate the request frequency $f_{REQ}$ to an on-time for the power switch SP 106.

Power converter controller 110 may be implemented as a monolithic integrated circuit or may be implemented with discrete electrical components or a combination of discrete and integrated components. Power converter controller 122 and the power switch SP 106 could form part of an integrated circuit that is manufactured as either a hybrid or monolithic integrated circuit. In one example, the entire power converter controller 110 may be referenced to the primary return (and return 119 may be equal to the input return 104) and the output sense circuit 115 may provide the galvanic isolation between the power converter controller 122 and the secondary side of the power converter. Examples of the output sense circuit 115 could include an optocoupler or a secondary side bias winding of the energy transfer element T1 103. However, some components of power converter controller 110 may be referenced to the input return 104 while other components of power converter controller 110 may be referenced to the output return 119. For that example, galvanic isolation may be provided by communication link 128.

The secondary controller 120 includes a request control circuit 122. The request control circuit 122 is coupled to receive a feedback signal representative of the output of the power converter 100 and generates a request signal $U_{REQ}$ 129 when more power is needed. The switching frequency of the power switch can be modulated in a range of a few percent by a jitter generator circuit (not shown in FIG. 1)

within the request control circuit 122. The jitter generator circuit will be explained in FIG. 2.

As mentioned previously, the request control circuit 122 is coupled to generate the request signal in response to the feedback signal $U_{FB}$ 126. The request signal $U_{REQ}$ 126 can include a single pulse. However, the request signal $U_{REQ}$ 129 can be appended with a synchronization signal when a jitter average signal (not shown in FIG. 1) is received, which will be further illustrated and explained in the upcoming figures. The synchronization signal corresponds to an average on time for the power switch 106.

Figure 2:
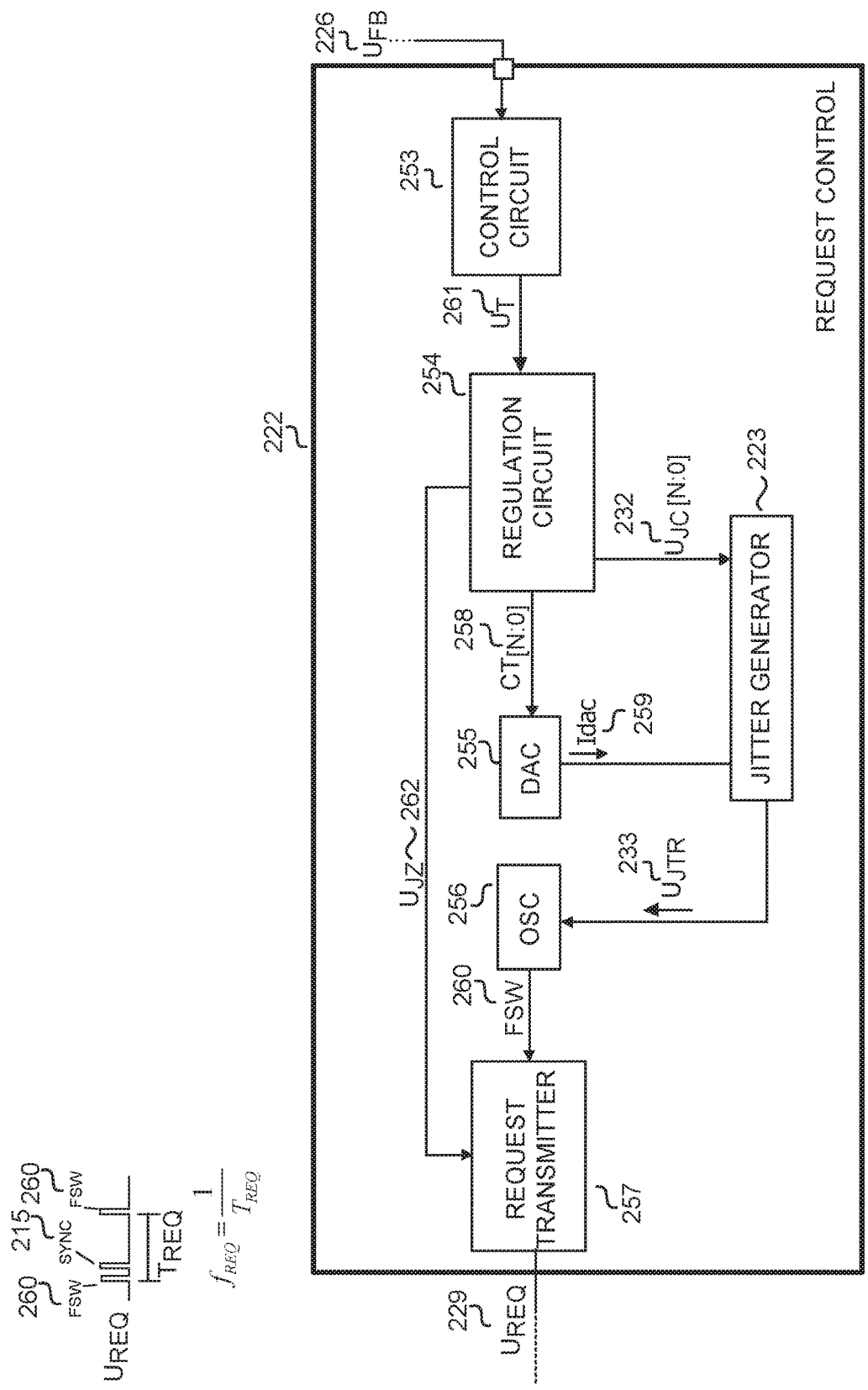
FIG. 2 illustrates a block diagram of a request control circuit included in the secondary controller of FIG. 1.

FIG. 2 illustrates a request control circuit as illustrated in FIG. 1. Thus, it is noted that the request control circuit 122 of FIG. 1 may be one example, and that similarly named and numbered elements referenced below are coupled and function similar to as described above. The request control circuit 222 is coupled to receive a feedback signal $U_{FB}$ 226 and output a request signal $U_{REQ}$ 229. The request control circuit 222 includes a jitter generator 223, a control circuit 253, a regulation circuit 254, a digital to analog converter (DAC) 255, an oscillator 256, and a request transmitter 257.

The control circuit 253 is coupled to receive a feedback signal $U_{FB}$ 226 and generate a target signal $U_T$ 261 representative of the desired output of the power converter. The regulation circuit 254 is coupled to receive the target signal $U_T$ 261 and generate a digital count signal CT 258. The digital count signal can be N bits, where N is representative of the number of bits. The digital to analog converter (DAC) 255 is coupled to receive the digital count signal CT 258, and generate a corresponding current $I_{dac}$ 259. The jitter generator 223 is coupled to receive the current $I_{dac}$ 259 from the DAC 255, and a jitter count signal $U_{JC}$ 232 from the regulation circuit 254. The jitter signal $U_{JC}$ 232 is a digital signal with N bits, where N is representative of the number of bits. The jitter generator 223 provides a jitter signal $U_{JTR}$ 233 to the oscillator 256.

The oscillator 256 generates a switching frequency FSW in response to the jitter signal $U_{JTR}$ 233. In one example, the oscillator can be a voltage controlled oscillator. The jitter signal $U_{JTR}$ 233 is used to charge a capacitor, which is compared against a voltage reference. When the voltage of the capacitor is greater than the reference, the switching FSW transitions to a logic high. The jitter signal $U_{JTR}$ 233 varies in response to the jitter count signal $U_{JC}$ 232. In one example, the switching frequency FSW 260 does not vary more than plus or minus a percentage due to the jitter signal $U_{JTR}$ 233. In one example, the percentage can be five percent.

The request transmitter 257 is coupled to receive the switching frequency signal FSW 260 and a jitter average signal $U_{JZ}$ 262 and generates the request signal $U_{REQ}$ 229. In the absence of receiving a jitter average signal $U_{JZ}$ 262, the request transmitter 257 generates a single pulse of the request signal $U_{REQ}$ 229. When a jitter average signal $U_{JZ}$ 262 is received, the request transmitter 257 can generate one or more additional pulses of the request signal $U_{REQ}$ 229. The one or more pulses can be known as a synchronization signal 215. The synchronization signal can correspond to an average on time for controlling the power switch. In other examples, the synchronization signal can correspond to various current limits for the power switch, an on-time, off-time, or duty cycle.

Figure 3:
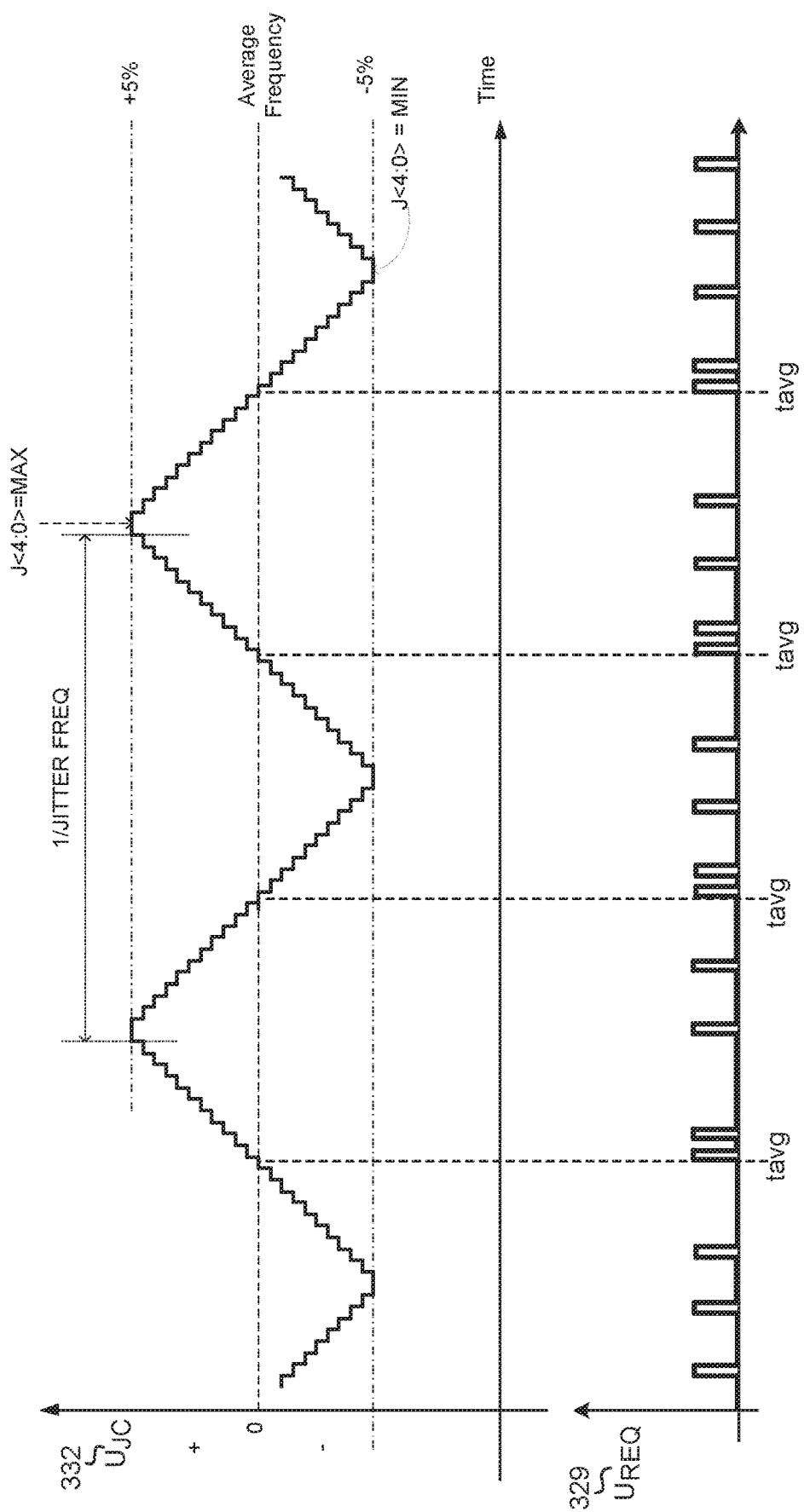
FIG. 3 illustrates a timing diagram of an example jitter count signal, and a request signal.

FIG. 3 illustrates a timing diagram of the jitter count signal and the request signal. The first timing diagram illustrates a jitter count signal $U_{JC}$ 332, and the second timing diagram illustrates a request signal $U_{REQ}$ 329. The jitter count signal $U_{JC}$ 332 changes from a positive value to a negative value and vice versa. The jitter count signal $U_{JC}$ 332 increments to a maximum value, such that the jitter signal causes the switching frequency to be modulated by a maximum of plus or minus 5 percent. In the example of FIG. 2, the count of the jitter count signal is represented by bits J<4:0>. When the jitter count signal $U_{JC}$ 332 reaches a maximum value, the jitter count signal $U_{JC}$ 332 begins to decrement. The jitter count signal $U_{JC}$ 332 decrements to minimum value, such that the jitter signal causes the switching frequency to vary by a maximum of minus 5%. When the jitter count signal $U_{JC}$ 32 either increments or decrements to zero, the request signal $U_{REQ}$ 329 is appended with a second pulse known as the synchronization signal that is transmitted from the request control circuit representative of an average switching frequency illustrated by the double pulse of the request signal $U_{REQ}$ 329 at time tavg. For illustrative purposes on FIG. 3, the jitter request signal $U_{REQ}$ 329 appended with the synchronization signal is shown when the jitter count signal $U_{JC}$ is zero. However, the request signal $U_{REQ}$ 329 appended with a synchronization signal is transmitted at the next request event for more power and is not necessarily transmitted exactly when the jitter count $U_{JC}$ 332 is zero.

In FIG. 3, the jitter count signal $U_{JC}$ 332 is illustrated as a sawtooth waveform, but it is appreciated the jitter count signal can be illustrated by other waveforms as well. In other examples, the jitter count signal $U_{JC}$ 332 can be a triangular waveform, a stepped, or stepladder waveform.

Figure 4:
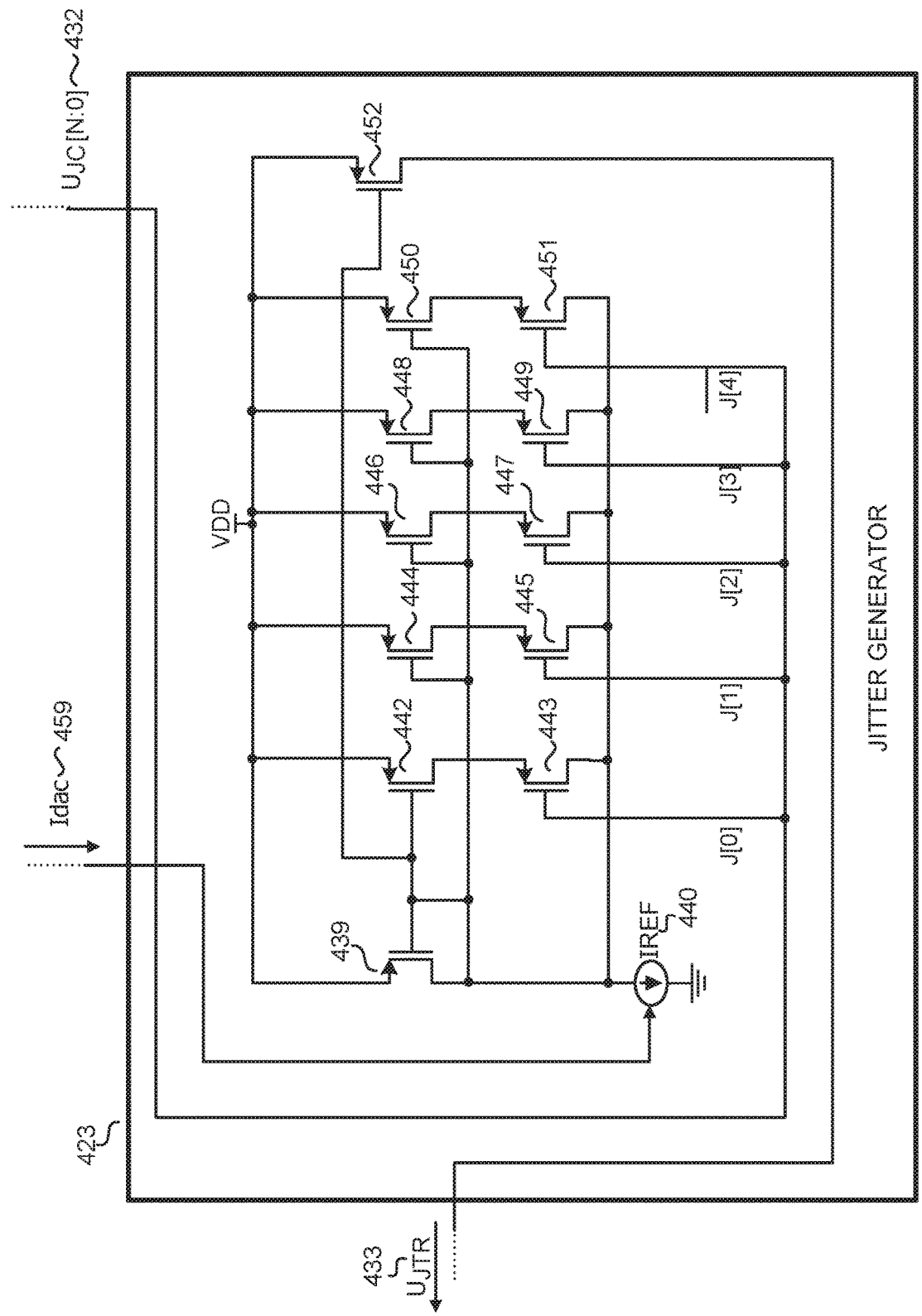
FIG. 4 illustrates a block diagram of a jitter generator circuit included in the request control circuit of FIG. 2.

FIG. 4 illustrates a schematic representation of a jitter generator shown in FIG. 2. As mentioned previously, the jitter signal $U_{JTR}$ 433 modulates the switching frequency, aka frequency jitter in order to spread the energy out to other frequencies. The littered switching frequency jitter is modulated from the original switching frequency by a percentage. In one example, the percentage can be plus or minus five percent. The jitter generator 423 is coupled to receive a jitter count signal $U_{JC}$ 432 from the regulation circuit and output a jitter signal $U_{JTR}$ 433. The jitter count signal $U_{JC}$ 432 is a multiple bit digital signal.

The jitter generator 423 includes a first transistor 439, a reference current source $I_{REF}$ 440, a plurality of transistors 442, 443, 444, 445, 446, 447, 448, 449, 450, 451, and a second transistor 452. In the example of FIG. 4, the jitter count signal has five bits, J[0] to J[4], where J[4] is representative of the sign bit. The sign bit is representative if the jitter count signal is a positive value, or a negative value. The plurality of transistors 442-451 are controlled in response to the individual bits of the jitter count signal $U_{JC}$ 432.

Figure 5:
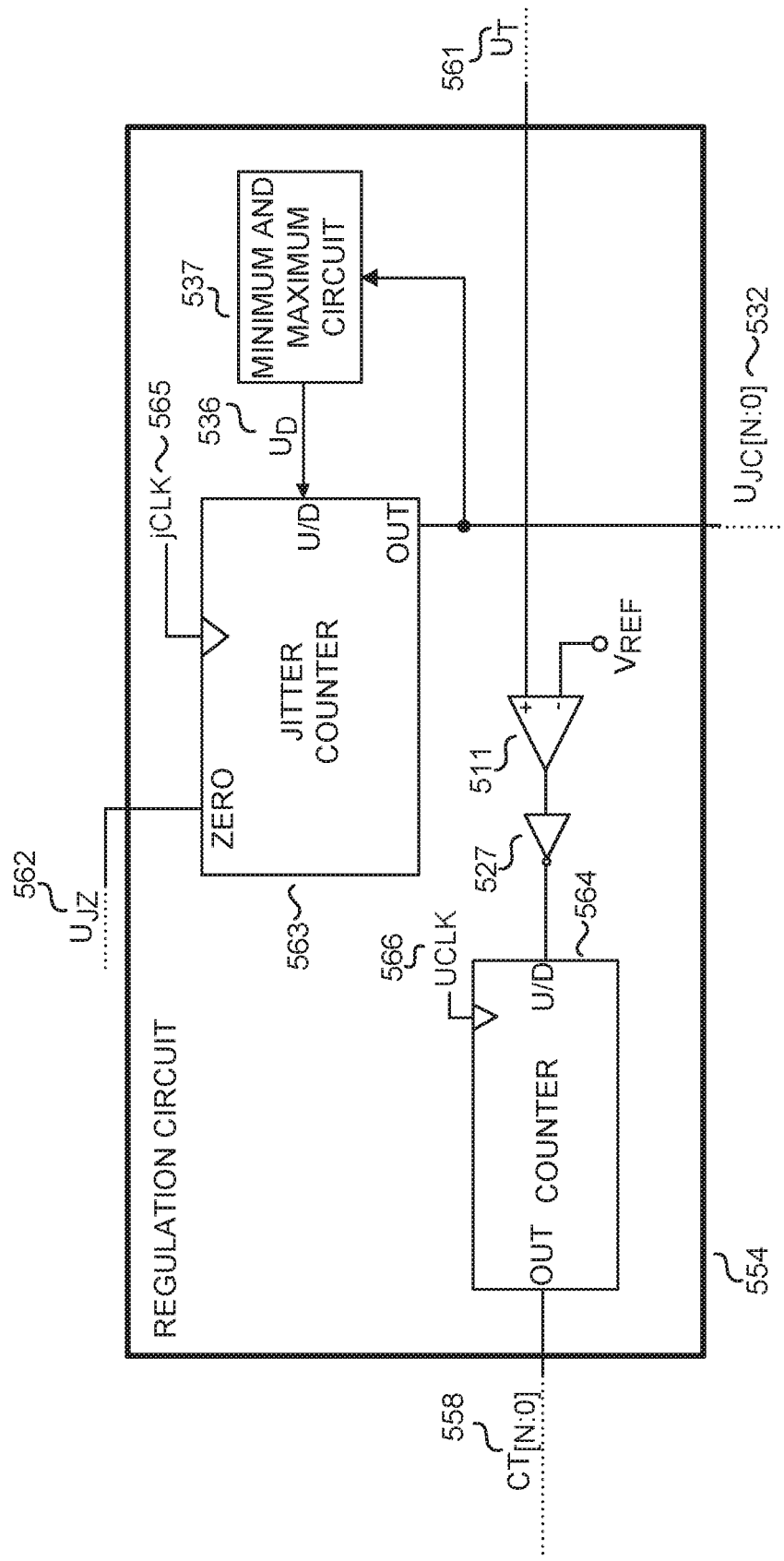
FIG. 5 illustrates a regulation circuit included in the request control circuit of FIG. 2.

FIG. 5 illustrates a regulation circuit as illustrated in FIG. 2. The regulation circuit 554 is coupled to receive a target signal $U_T$ 561, and outputs a jitter count signal $U_{JC}$ 532, a count signal CT 558, and a jitter average signal $U_{JZ}$ 562. The regulation circuit 554 includes a inverter 527, a comparator 511, a jitter counter 563, a counter 564, and a minimum and maximum circuit 537. In FIG. 5, the jitter counter 563 and counter 564 are illustrated as up down counters, but other types can be used for the jitter counter 563 and counter 564. The jitter counter 563 is coupled to increment or decrement a jitter count signal $U_{JC}$ 532 at a rate determined by the jitter clock jCLK 565. The jitter count signal $U_{JC}$ 532 can be a multiple bit digital signal with N bits, where N is representative of the number of bits. In one example, the jitter clock jCLK 565 can have a frequency of 1 kHz to 2 kHz. The minimum and maximum circuit 537 is coupled to receive the jitter count signal $U_{JC}$ 532, and output a direction signal $U_D$ 536. As mentioned previously, the jitter count signal $U_{JC}$ 532 increments until a maximum value is reached, and then decrements. The jitter count signal $U_{JC}$ 532 decrements until a minimum value is reached, and then increments. As seen in FIG. 5, a first state of the direction signal 536 is received by the jitter counter in order to increment the jitter count signal $U_{JC}$ 532. Once the maximum value of the jitter count signal is reached, the minimum and maximum circuit 537 changes to a second state of the direction signal 536 such that the jitter counter 563 decrements the jitter count signal $U_{JC}$ 532 until the jitter count signal $U_{JC}$ 532 reaches a minimum value. When the value of the jitter count signal $U_{JC}$ 532 is as a median value, in one example, zero, the jitter counter 563 outputs a jitter average signal $U_{JZ}$ 562.

The comparator 511 is coupled to receive the target signal $U_T$ 561 from the control circuit at the non inverting input, and a voltage reference $V_{REF}$ at the inverting input. The target signal $U_T$ 561 can be an analog or digital signal. In a first case, the target signal $U_T$ 561 that is greater than a voltage reference, which is representative that the power converter needs less power. The output of the comparator 511 is a logic high, but is inverted to a logic low by inverter 527. The counter 564 is coupled to receive the output of inverter 527. The count signal CT 558 is decremented in response to receiving a logic low signal from inverter 527. The frequency in which the counter 564 is incremented or decremented is determined by the clock frequency UCLK 566. In one example, the clock frequency of counter 564 can be from 10 kHz to 50 kHZ.

In a second case, the target signal $U_T$ 561 is less than a voltage reference $V_{REF}$, which is representative that the power converter needs more power. The output of the comparator 511 is a logic low, but is inverted to a logic high by inverter 527. The counter 564 is coupled to receive the output of inverter 527. The count signal CT 558 is incremented in response to receiving a logic high signal from inverter 527.

Figure 6:
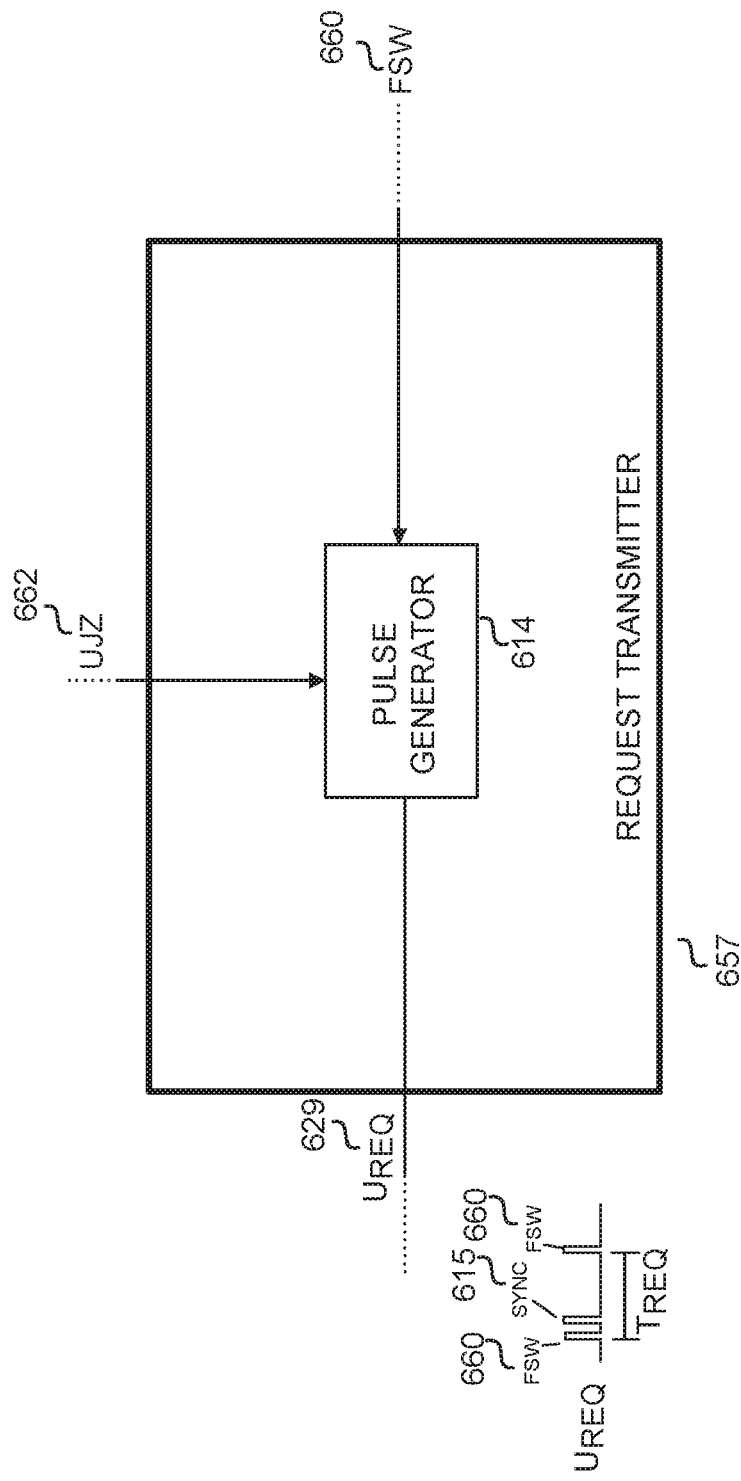
FIG. 6 illustrates a request transmitter included in FIG. 4.

FIG. 6 illustrates a request transmitter as illustrated in FIG. 2. The request transmitter 657 is coupled to receive the switching frequency signal FSW 660, a jitter average signal $U_{JZ}$ 662, and output a request signal $U_{REQ}$ 629. The request transmitter 657 includes a pulse generator 614. The pulse generator is coupled to output a single pulse in response to the switching frequency signal FSW 660, and is further coupled to output a synchronization pulse 615 in response to receiving the jitter average signal $U_{JZ}$ 662, representative of the average on time of the power switch. As mentioned previously in FIG. 3, the request signal $U_{REQ}$ 629 with a synchronization pulse 615 is transmitted at the next request event after a jitter average signal $U_{JZ}$ 662 is received.

Figure 7:
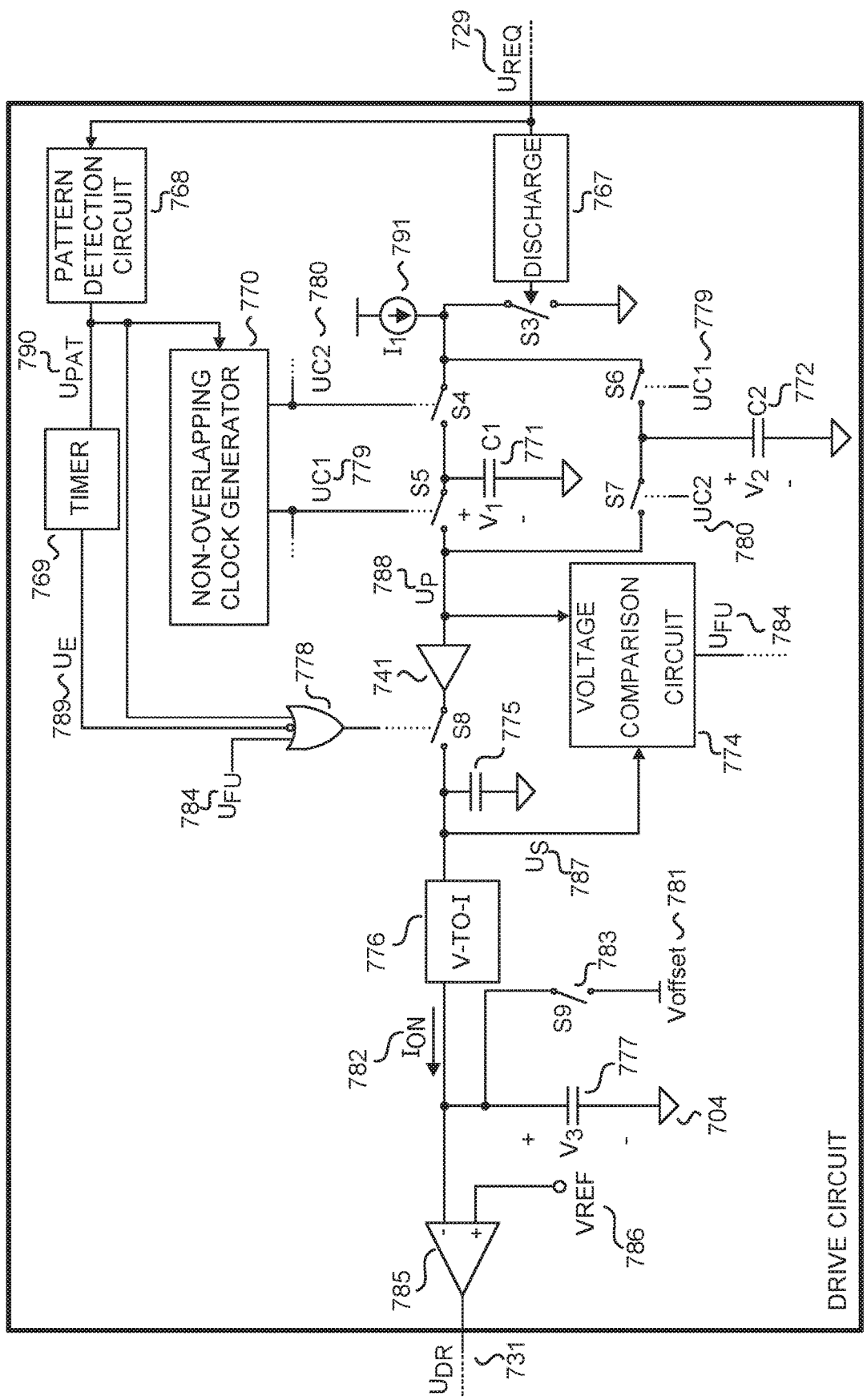
FIG. 7 illustrates a schematic block diagram of a drive circuit included in the primary controller in FIG. 1.

FIG. 7 illustrates a drive circuit as illustrated in FIG. 1 on the primary controller. The drive circuit 730 is coupled to receive the request signal $U_{REQ}$ 729 and generate a drive signal $U_{DR}$ 731 to control a power switch. The drive circuit 730 includes a discharge circuit 767, a pattern detection circuit 768, a timer circuit 769, a non-overlapping clock generator 770, a voltage comparison circuit 774, and a voltage to current (V-to-I) converter 776. Further included in FIG. 7 includes a logic gate 778, a capacitor C1 771, a second capacitor C2 772, a switch S3, capacitors 775 and 777, a switch S9 783, and a comparator 785.

The drive circuit 730 updates the average on time of the power switch when switch S8 is closed and capacitor 775 is charged. The switch S8 is closed in response to the logic gate 778, which includes three inputs. The first condition to update the average on time occurs when the drive circuit receives a request signal $U_{REQ}$ 729 that includes a double pulse, such as a request signal appended with the synchronization signal. The pattern detection circuit 768 generates the pattern detection signal $U_{PAT}$ 790 and is received by one input of the logic gate 778. In the example of FIG. 7, the logic gate 778 is closed in response to the pattern detection signal $U_{PAT}$ 790.

The second condition to update the average on time occurs if a request signal $U_{REQ}$ 729 with a pattern such as a double pulse is not detected after a time period. In other words, if the timer circuit 769 expires because a request signal with a synchronization signal has not been received. The logic gate 778 is coupled to receive the expiration signal $U_E$ 789 and close the switch S8. The average on time is updated cycle by cycle until the double pulse of the request signal is received such that the expiration signal $U_E$ 789 transitions from a logic low to logic high.

The third condition to update the average on time occurs when the received request signal $U_{REQ}$ 729 is greater than or less than a percentage of the previously stored request signals. If the condition is true, the average on time is forced to update in response to the received request signal $U_{REQ}$ 729. The logic gate 778 is coupled to receive the force update signal $U_{FU}$ 784, and close switch S8.

The operation to correlate the on time for the power switch from the frequency of the request signal $U_{REQ}$ 729 will be described. The desired on-time can be updated in response to the three conditions mentioned previously. In operation, when a request signal $U_{REQ}$ 729 is received, either capacitor C1 771 or capacitor C2 is charged. While one capacitor C1 or C2 is being charged, the previously charged other capacitor C2 or C1 provides a voltage representative of the stored frequency signal. The capacitors C1 771 or C2 772 are charged until the next request signal $U_{REQ}$ 729 is received. A longer period from one request signal to the next request signal, results in a higher voltage V1 for capacitor C1 771 or a higher voltage V2 for capacitor C2 772. The voltage of the capacitors C1 and C2 can be representative of the frequency of the request signal $U_{REQ}$ 729. With a shorter period of the request signal $U_{REQ}$ 729, the capacitors are charged for less time resulting in a lower voltage V1 on capacitor C1 771 or a lower voltage V2 on capacitor C2 772.

The pattern detection circuit 768 is coupled to receive the request signal $U_{REQ}$ 779, and determine if a pattern has been detected such as a double pulse. In other examples, the pattern detection circuit 768 can detect a specific sequence of pulses. In example of FIG. 7, the pattern detection circuit 768 can determine if the request signal includes a synchronization signal. The pattern detection circuit 768 is coupled to generate a pattern detection signal $U_{PAT}$ 790. The non-overlapping clock generator is coupled to receive the pattern detection signal $U_{PAT}$ 790 and generate a first non-overlapping clock signal UC1 779 and a second non-overlapping clock signal UC2 780. The first non-overlapping clock signal UC1 779 and second non-overlapping clock signal UC2 780 control switches S4, S5, S6, and S7 respectively.

When a request signal $U_{REQ}$ 729 is received such that the capacitor C1 is to be charged, switch S4 is closed by the second non-overlapping clock signal UC2 780, switch S5 is opened by the first non-overlapping clock signal UC1, and switch S3 is opened. When switch S4 is closed, the current source I1 791 is coupled to charge the first capacitor C1 771, The voltage V1 of capacitor C1 771 can be used to update the average on time in the case of the three conditions mentioned above when switch S5 is closed by the first non-overlapping clock signal UC1 779, and S4 is opened by the second non-overlapping clock signal UC2 780, and switch S3 is open.

To charge the second capacitor C2 772 in response to receiving the request signal $U_{REQ}$ 729, switch S6 is closed by the first non-overlapping clock signal UC1 779, and switch S7 is opened by the second non-overlapping clock signal 780, and switch S3 is opened. When switch S6 is closed, the current source I1 791 is coupled to charge the second capacitor C2 772. The voltage V2 of capacitor C2 772 can be used to update the average on time in the case of the three conditions mentioned above when switch S7 is closed by the second non-overlapping clock signal UC2 780, switch S6 is opened by the first non-overlapping clock signal UC1 779, and switch S3 is open.

Prior to charging capacitor C2, capacitor C2 is fully discharged within a short period such as less than 100 nanoseconds. To discharge capacitor C2 771, switch S6 is closed by the first non-overlapping clock signal UC1 779, switch S7 is opened by the second non-overlapping clock signal UC2 780, and the discharge circuit 767 is coupled to close switch S3 for a very short time.

Prior to charging capacitor C1 771, capacitor C1 771 is fully discharged within a short period such as less than 100. To discharge capacitor C1 771, switch S4 is closed by the second non-overlapping clock signal UC2 780, switch S5 is open by the first non-overlapping clock signal UC1 779, and the discharge circuit 767 is coupled to close switch S3 for a very short time.

The first condition to update the average on time occurs when the drive circuit receives a request signal $U_{REQ}$ 729 that includes a double pulse, such as a request signal appended with the synchronization signal. Switch S5 is closed such that the voltage V1 of capacitor C1 771 or switch S7 is closed such that the voltage V2 of capacitor C2 772 is received by buffer 741, and charges capacitor 775 when switch S8 is closed.

The second condition to update the average on time occurs if a request signal $U_{REQ}$ 729 with a pattern such as a double pulse is not detected after a time period. Switch S5 is closed such that the voltage V1 of capacitor C1 771 or switch S7 is closed such that the voltage V2 of capacitor C2 772 is received by buffer circuit 741, and charges capacitor 775 when switch S8 is closed.

The third condition to update the average on time occurs when the received request signal $U_{REQ}$ 729 is greater than or less than a percentage of the previously stored request signal. Switch S5 is closed such that the voltage V1 of capacitor C1 771 or switch S7 is closed such that the voltage V2 of capacitor C2 772 is received by buffer 741. The instant frequency signal $U_P$ 788 representative of either voltage V1 or V2 is coupled to be received by the voltage comparison circuit 774. The voltage comparison 774 is coupled to compare the voltage of capacitor 775 representative of the stored frequency signal $U_S$ and generate a force update signal $U_{FU}$ 784 when the instant frequency signal $U_P$ 788 is greater than or less than a percentage of the stored frequency signal $U_S$ 787.

The V-to-I converter 776 is coupled to receive the stored frequency signal $U_S$ 787 and generate a corresponding on time current signal $I_{ON}$ 782 representative of the desired on time of the drive signal 731. The on time current signal $I_{ON}$ 782 charges capacitor 777 to a voltage $V_3$. Prior to charging capacitor 777, the capacitor 777 is discharged by switch S9 783 to a voltage offset 781. The voltage offset 781 can be used to implement a foldback function to decrease the on time of the power switch. Such cases where a foldback function can be implemented include where the temperature of the power converter controller rises above a certain level or the input voltage droops below a certain level. The on time of the power switch can be expressed as $$t_{ontime} = \frac{(V_{REF} - V_{OFFSET}) * C}{I_{ON}}. \qquad (1)$$

$V_{REF}$ is the voltage reference $V_{REF}$ 786, $V_{OFFSET}$ is representative of $V_{OFFSET}$ 781, the on current signal $I_{ON}$ 782, and C is representative of the capacitor 775.

The comparator 785 is coupled to receive the voltage V3 at the inverting terminal, and the voltage reference $V_{REF}$ at the non-inverting reference. The drive signal $U_{DR}$ 731 remains logic high when $V_{REF}$ is greater than voltage V3.

Figure 8:
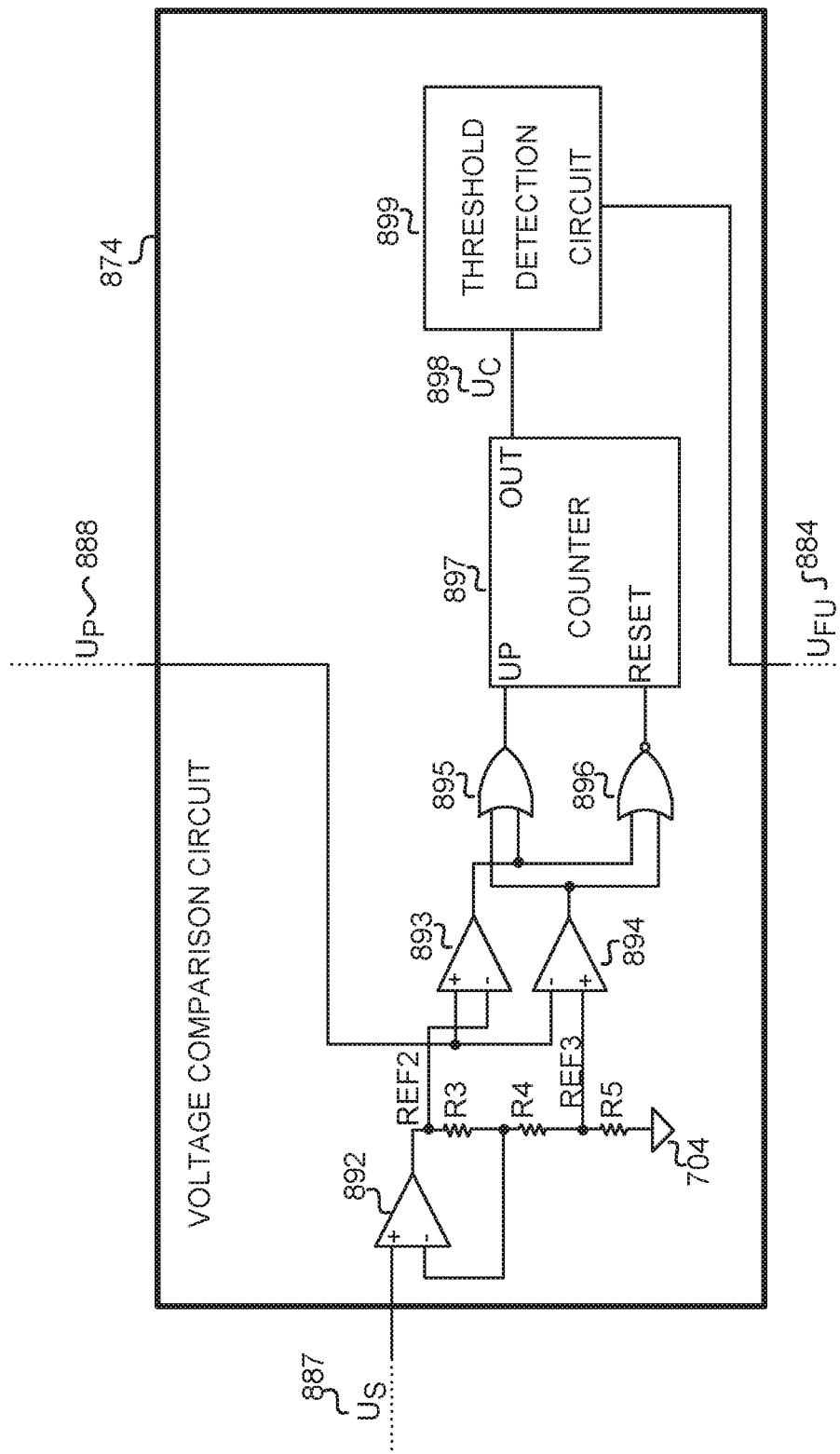
FIG. 8 illustrates a voltage comparison circuit included in the drive circuit of FIG. 7.

FIG. 8 illustrates a voltage comparison circuit as shown in FIG. 7. The voltage comparison circuit 874 includes an operational amplifier 892, comparators 893, 894, logic gates 895, 896, counter 897, and a threshold detection circuit 899. The voltage comparison circuit 874 is coupled to receive the instant frequency signal $U_P$ 888 and the stored signal $U_S$ 887 and determine if the instant frequency signal $U_P$ 888 is greater or less than a percentage of the stored frequency signal $U_S$ 887.

In operation, the voltage comparison circuit 874 is coupled to determine if the instant frequency signal is greater than or less than a percentage of the stored signal $U_S$ 887. If this condition occurs consecutive times, a force update signal $U_{FU}$ 884 is generated. The operational amplifier 892 is coupled to receive the stored signal $U_S$ 887. The operational amplifier is coupled to generate reference REF2 and reference $U_S$ REF3 through resistors R3, R4, and R5. REF 2 can be expressed as $$REF2 = U_S + \frac{R3}{R4 + R5} * U_S. \qquad (2)$$

Furthermore, REF3 can be expressed as $$REF3 = U_S - \frac{R4}{R4 + R5} * U_S. \qquad (3)$$

Comparator 893 is coupled to receive the instant frequency signal $U_P$ 888 at the non-inverting input, and the reference REF2 at the inverting input. Comparator 894 is coupled to receive the instant frequency signal $U_P$ 888 at the inverting input, and the reference REF3 at the non-inverting input. Comparator 893 can determine if the instant signal $U_P$ 888 is greater than a percentage of the stored signal $U_S$ 887. Comparator 894 can determine if the instant signal $U_P$ 888 is less than a percentage of the stored signal $U_S$ 887. Logic gate 895 is coupled to the output comparator 893 at a first input, and the output of comparator 894 at a second input. The output of logic gate 895 is coupled to increment counter 897 when either the instant frequency signal is greater than or less than a percentage of the stored signal $U_S$ 887. Logic gate 896 is coupled to the output of comparator 893 at a first input, and the output of comparator 894 is at a second input. Logic gate 896 transitions to a logic high when the output of comparator 893 and the output of comparator 894 are both are logic low. The output count $U_C$ 898 of the counter 897 is reset when the instant frequency signal $U_P$ 888 is not greater than or less than a percentage of the stored frequency signal $U_S$ 887. If a consecutive condition occurs, such as the instant signal is greater than the stored signal multiple times, or the instant signal is less than a percentage of the stored signal multiple times, the output count $U_C$ 898 will increment. A threshold detection circuit 899 is coupled to receive the output count $U_C$ 898 and generate the force update signal $U_{FU}$ 884 when the output count $U_C$ 898 exceeds a threshold. In one example, the output count $U_C$ 898 is two or more before the threshold detection signal 899 generates the force update signal $U_{FU}$ 884.

Figure 9:
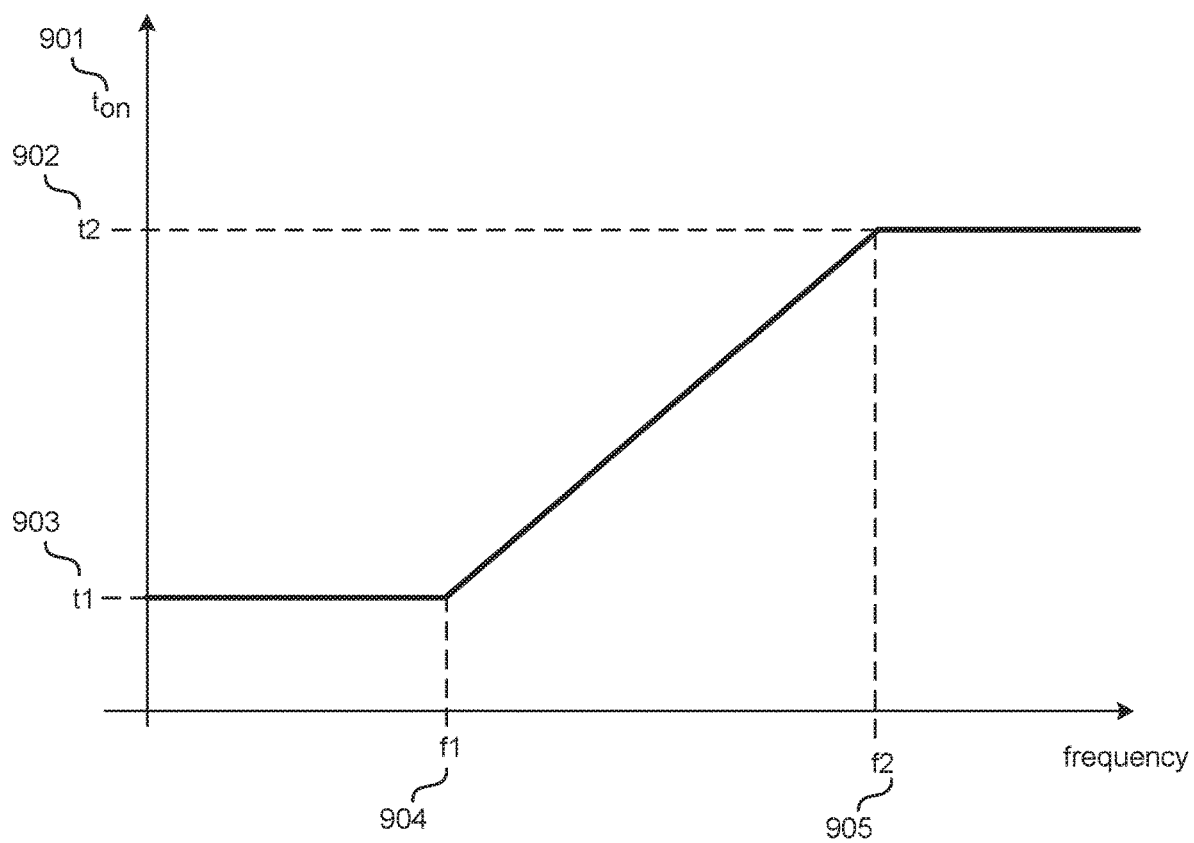
FIG. 9 illustrates a graph representative of the on time of the power switch versus the switching frequency.

FIG. 9 illustrates a graph illustrating the frequency versus the on time. As described in FIG. 8, the drive circuit correlates the frequency of the request signals to an on time for the power switch. As illustrated, at a fixed on time t1 903, there is a corresponding frequency f1 904. If the frequency is lowered than f1 904, the on-time remains the same. In the region between frequency f1 904 and frequency f2 902, the on time and frequency can be increased or decreased in a linear fashion. In the region after frequency f2 905, as the frequency is increased, the on-time remains the same.

Figure 10A:
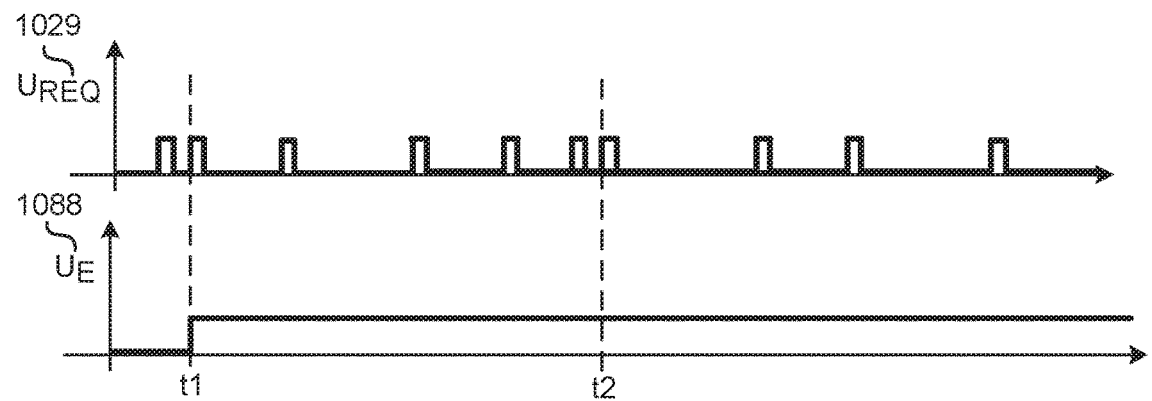
FIG. 10A illustrates a timing diagram illustrating an example request signal and an expiration signal.

FIG. 10A illustrates the timing diagrams of the request signal, and the expiration signal of the timer as shown in FIG. 7. Before time t1, the request signal $U_{REQ}$ 1029 asserts one pulse, and the expiration signal $U_E$ 1088 of the timer is logic low. At time t1, the jitter count signal is zero, and the request transmitter generates an additional pulse as illustrated by the second pulse of the request signal $U_{REQ}$ 1029. The expiration signal $U_E$ 1088 transitions to a logic high, which occurs when the timer circuit is reset in response to the jitter count signal reaching the jitter average value. After time t1, additional request signal $U_{REQ}$ 1029 is generated by the request transmitter as necessary when more power is requested. The expiration signal $U_E$ 1088 remains logic high. At time t2, the jitter count signal (not shown) is zero and the request transmitter generates an additional pulse as illustrated by second pulse of the request signal $U_{REQ}$ 1029. After time t2, additional request signal $U_{REQ}$ 1029 is generated by the request transmitter as necessary when more power is requested and the expiration signal $U_E$ 1088 remains a logic high.

Figure 10B:
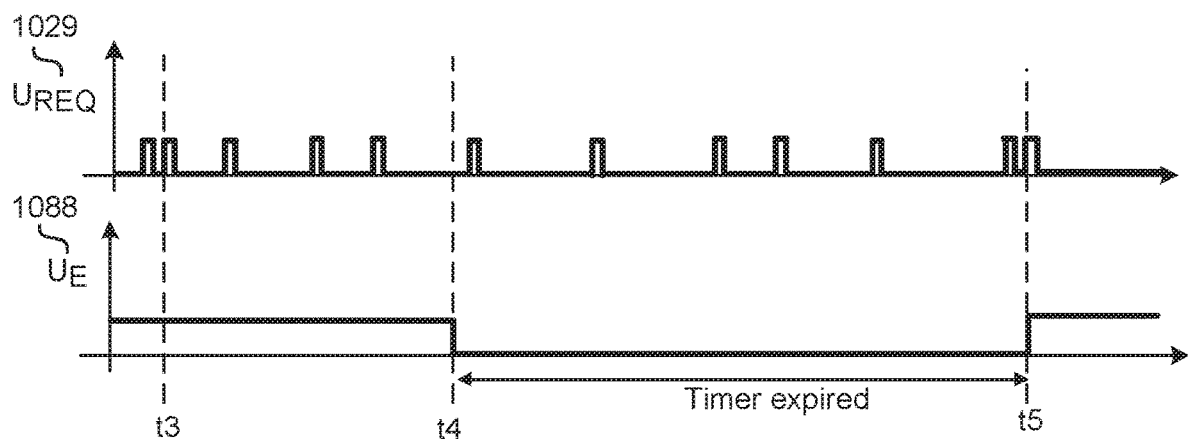
FIG. 10B illustrates another example of an example request signal and an expiration signal.

FIG. 10B illustrates the timing diagrams illustrates the request signal and the expiration signal of the timer as shown in FIG. 7, except the timer has expired, and is only reset in response to receiving another double pulse of the request signal. Before time t3, a request signal $U_{REQ}$ 1029 is generated, and the expiration signal $U_E$ 1088 is a logic high. At time t3, the jitter count signal is at the jitter average value and the timer is reset, represented by the expiration signal $U_E$ 1088 remaining a logic high. At between t3 and time t4, additional request signals $U_{REQ}$ 1029 are generated as necessary when more power is requested and the expiration signal $U_E$ 1088 remains a logic high. At time t4, the jitter count signal is not at the median value, and the request transmitter does not generate an additional request signal $U_{REQ}$ 929. The expiration signal $UR_{REQ}$ 1029 transitions to a logic low in response to the timer circuit expiring. In one example, the timer circuit can expire at a time of 300 microseconds. At time between t4 to t5, the request signal $U_{REQ}$ 1029 generates additional request signals as necessary when more power is requested, but the average switching frequency is updated on a cycle by cycle basis. At time t5, the jitter count signal is at the median value, and the request transmitter generates an additional request signal $U_{REQ}$ 1029, The expiration signal $U_E$ 1088 transitions to a logic high as the timer circuit has been reset.

Figure 10C:
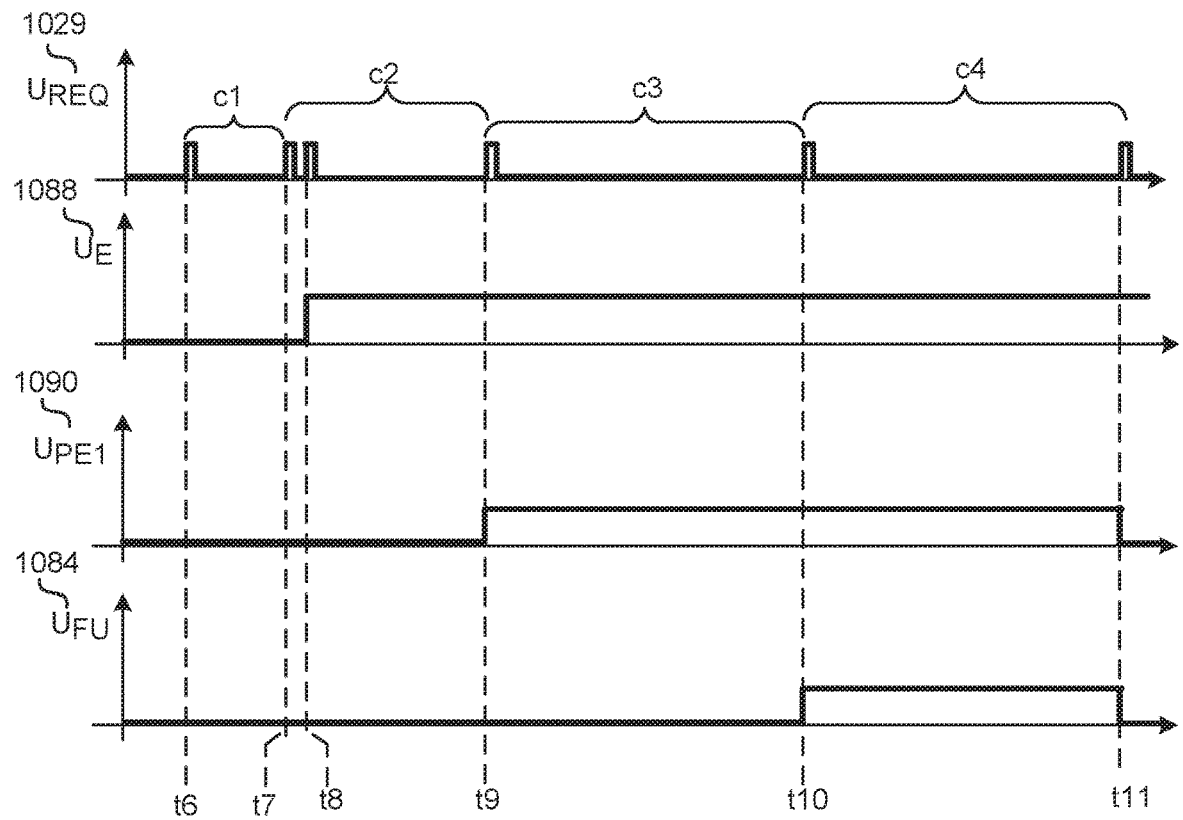
FIG. 10C illustrates an example of a request signal, an expiration signal, a comparison signal, and a force update signal.

FIG. 10C illustrates the timing diagram for when the request signal is greater than a percentage of the stored frequency signal. At time t6, the request signal $U_{REQ}$ 1029 generated by the request transmitter of the secondary controller. The expiration signal $U_E$ 1088 is a logic low, representative of the timer circuit of the drive circuit that is expired. The instant frequency signal is representative of the time period between two request signal pulses, and the stored frequency is the previous time period between two request signal pulses. The comparison signal $U_{PE1}$ 1090 is representative of the output of comparator 893 in FIG. 8, when the instant frequency signal is greater than a percentage of the stored frequency signal. The force update signal $U_{FU}$ 1084 is a logic low. At time t7, the jitter count signal is at the median value, the request signal $U_{REQ}$ 1029 is a double pulse. The expiration signal $U_E$ 1088 transitions to a logic high, representative of the timer circuit being reset. As mentioned in FIG. 7, when a double pulse is received, the average on time is updated. As such the request period C1 is updated to the stored frequency signal. Thus, the comparison signal $U_{PE1}$ 1090 is a logic low, representative of the output of comparator 893. The force update signal $U_{FU}$ 1084 remains a logic low.

At time t8, the synchronization signal of the request signal $U_{REQ}$ 1029 is generated and the expiration signal $U_E$ 1088 remains a logic high. At time t9, the second request period c2, representative of the instant frequency signal is compared against the first request period c1, representative of the stored frequency signal, thus the comparison signal $U_{PE1}$ 1090 transitions to a logic high because the second request period c2 is greater than a percentage of the first request period c1. The expiration signal $U_E$ 988 remains a logic high.

At time t10, the comparison signal $U_{PE1}$ 1090 is generated in response to the comparison of the third request period c3 to the first request period c1. The force update signal $U_{FU}$ 1084 transitions to a logic high because the comparison signal $U_{PE1}$ 990 was logic high for a consecutive number of times, and the stored frequency signal is updated to the instant frequency signal. At time t11, the request signal $U_{REQ}$ 1029 is generated, the expiration signal UE 1088 is a logic high, and the comparison signal $U_{PE1}$ 1090 transitions to a logic low because the stored frequency signal is updated to request period c3. The request period c3 is not greater than a percentage of the fourth request period c4. The force update signal $U_{FU}$ 1084 transitions to a logic low.

Figure 10D:
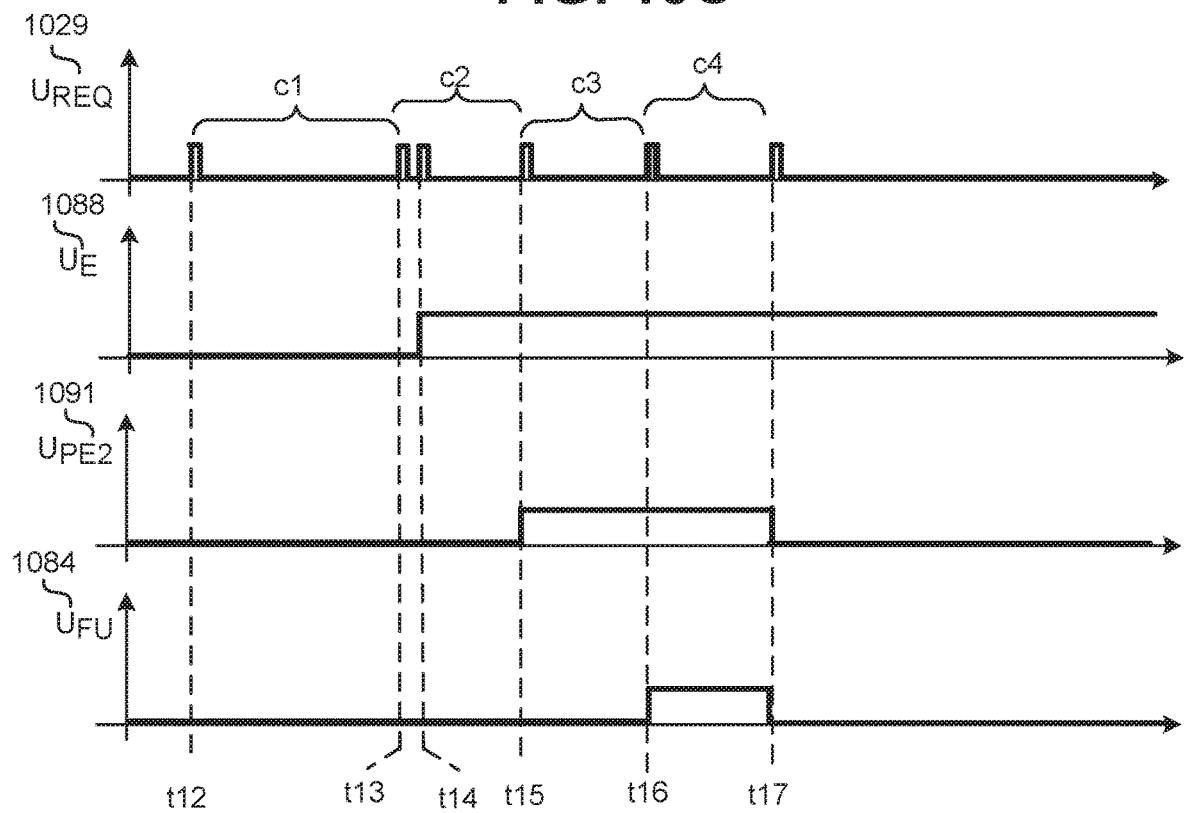
FIG. 10D illustrates an example of a request signal, an expiration signal, a comparison signal, and a force update signal.

FIG. 10D illustrates the timing diagrams for the when instant frequency signal of the request signal is less than a percentage of the stored frequency signal. At time t12, the first request signal $U_{REQ}$ 1029 is generated by the request transmitter of the secondary controller. The expiration signal $U_E$ 1088 is a logic low, representative of the timer circuit that is expired. The instant frequency is representative of the time period between two request pulses, and the stored frequency is the previous time period between two request pulses. The comparison signal $U_{PE2}$ 1091 is representative of the output of comparator 894 in FIG. 8, when the instant frequency signal is less than a percentage of the stored frequency signal. The force update signal $U_{FU}$ 1084 is a logic low.

At time t13, the jitter count signal is at the median value, the request signal $U_{REQ}$ 1029 is generated. The expiration signal $U_E$ 1088 is a logic low, the comparison signal $U_{PE2}$ 1091 is a logic low, and the force update signal $U_{FU}$ 1084 is a logic low. At time t14, the expiration signal $U_E$ 1088 transitions to a logic high due to the double pulse of the request signal $U_{REQ}$ 1029, representative of the timer circuit being reset. As mentioned previously, when a double pulse is received, the average on time is updated. As such the request period c1 is updated as the stored frequency signal.

At time t15, the second request period c2, representative of the instant frequency signal is compared against the first request period c1. The comparison signal $U_{PE2}$ 1091 transitions to a logic high because the second request period c2 is less than a percentage of the first request period c1. The expiration signal $U_E$ 1088 remains a logic high.

At time t16, the request signal $U_{REQ}$ 1029 is generated, the expiration signal $U_E$ 1088 remains a logic high, and the comparison signal $U_{PE2}$ 1091 transitions to a logic high. The comparison signal $U_{PE2}$ 1091 generated in response to the comparison of the third request period c3 to the first request period c1. The force update signal $U_{FU}$ 1084 transitions to a logic high, representative of the comparison signal $U_{PE2}$ 1091 being a logic high for a consecutive number of times, and stored signal is updated to the third request period c3.

At time t17, the request signal $U_{REQ}$ 1029 is generated, the expiration signal $U_{REQ}$ 1088 is a logic high, and the comparison signal $U_{PE2}$ 1091 transitions to a logic low. The comparison signal $U_{PE2}$ 1091 at time t17 is generated in response to the comparison of fourth request period c4 to the third request period c3. In this case, the fourth request period c4 is not less than a percentage of the stored request period c3. The force update signal $U_{FU}$ 1084 transitions to a logic low.

Figure 11:
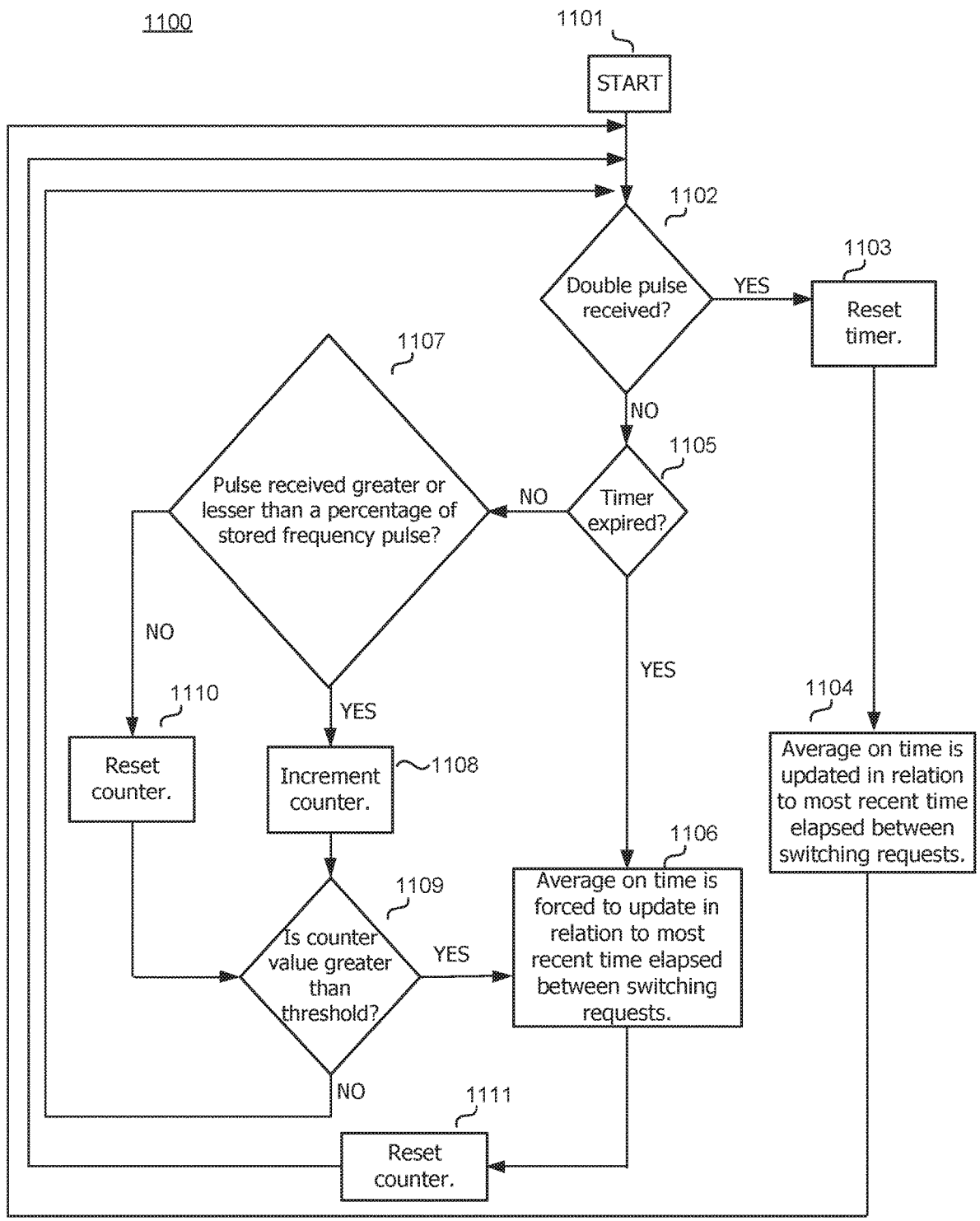
FIG. 11 illustrates a process for updating the average on time in response to the request signal.

FIG. 11 is a flow diagram illustrating an example process 1000 for updating an average on time, in accordance with an example of the present invention. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

Process 1100 begins at the start block 1101. Start block 1101 proceeds to decision block 1102. At decision block 1102, the drive circuit of the primary controller determines if a double pulse of the request signal has been received. If the condition is true, process 1100 proceeds to process block 1103. At process block 1103, the timer within the drive circuit is reset. Process 1100 proceeds to process block 1104. At process block 1104, the average on time is updated in relation to most recent time elapsed between switching events. Process 1100 loops back to decision block 1102.

If decision block 1102 is a not true, process 1100 proceeds to decision block 1105. At decision block 1105, the status of the timer circuit is determined. In other words, has the expiration signal transitioned from a logic high to logic low? lithe condition is true, process 1100 proceeds to process block 1106. At process block 1106, the average on time is forced to update in relation to most recent time elapsed between switching events. Process 1100 proceeds to process block 1111. At process block 1111, the counter of the voltage comparison circuit shown in FIG. 8 is reset. Process 1100 loops back to decision block 1102.

If the condition of decision block 1105 is false, process 1100 proceeds to decision block 1107. At decision block 1107, the voltage comparison circuit shown in FIG. 7 and FIG. 8 determine if the pulse received of the request signal is greater than or less than a stored frequency percentage. If the condition of decision block 1107 is true, process 1100 proceeds to process block 1108. At process block 1108, the counter of the voltage comparison circuit is incremented. Process 1100 proceeds to decision block 1109. At decision block 1109, the threshold detection circuit of the voltage comparison circuit determines if the counter value is greater than a threshold. If the condition is not true, process 1000 loops back to decision block 1102. If the condition is true, process 1100 proceeds to process block 1106. At process block 1106, the average on time is forced to update in relation to most recent time between switching requests.

Process 1100 proceeds to process block 1111. At process block 1111, the counter is reset. Process 1108 then loops back to decision block 1102.

If the condition of decision block 1107 is false, process 1100 proceeds to process block 1110. At process block 1110, the counter of the voltage comparison circuit is reset. Process 1100 proceeds to decision block 1109.

Figure 12:
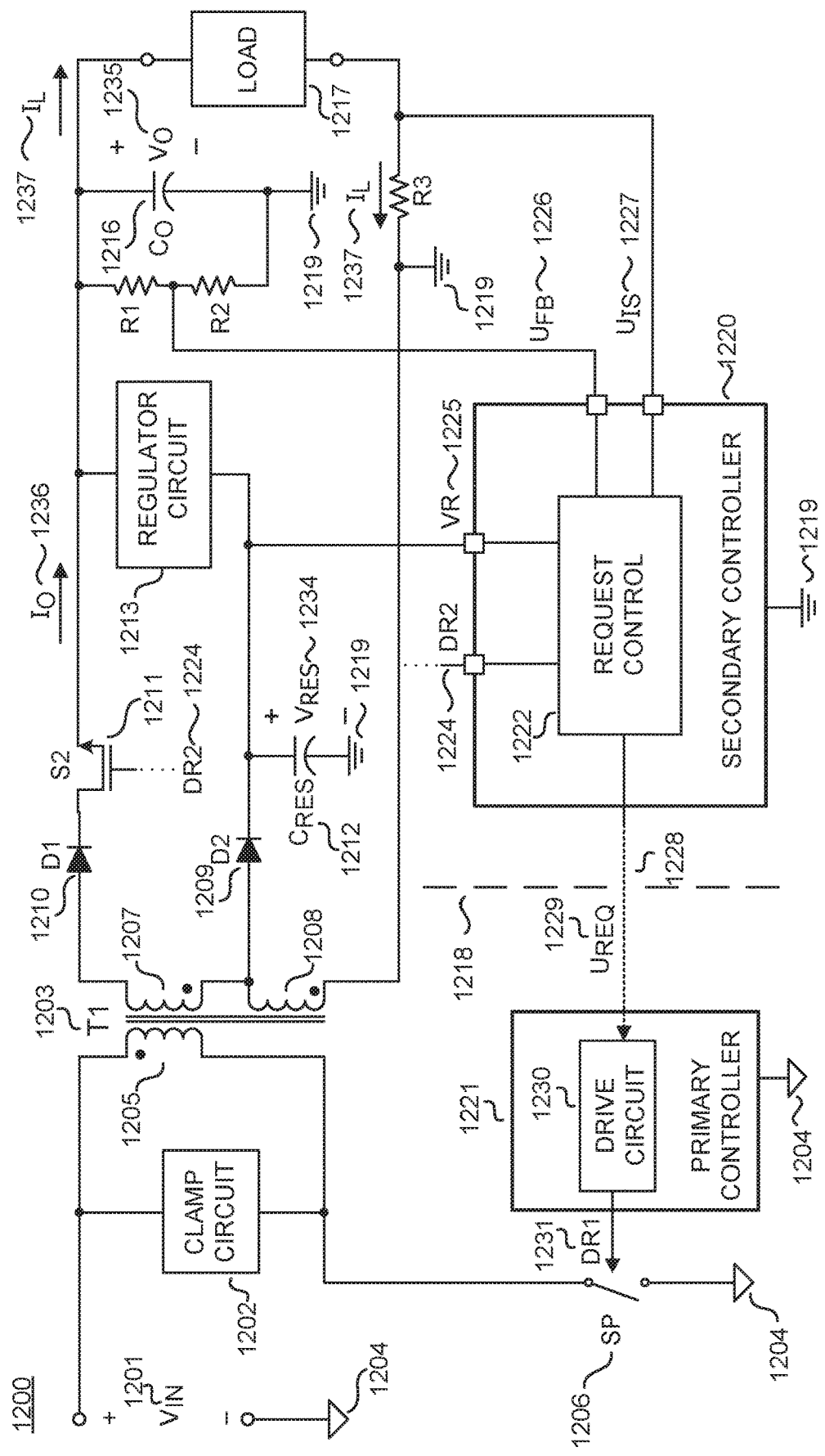
FIG. 12 illustrates another example of a schematic block diagram that illustrates an example power converter that receives an input voltage to produce an output voltage and an output current and is regulated by a primary and secondary controller in accordance with the teachings of the present invention Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

FIG. 12 illustrates one example of a switched mode power converter 1100 that utilizes a secondary controller with a request control circuit and a jitter generator Thus, it is noted that the power converter 1200 of FIG. 12 may be one example of power converter of FIG. 1, and that similarly named and numbered elements referenced below are coupled and function similar to as described above.

The controller of power converter 1200 includes a primary controller 1221 and a secondary controller 1220. In addition, the power converter 1200 further includes a regulator circuit 1213 coupled between the multiple outputs of the power converter 1200. The secondary controller 1220 can receive a reservoir sense signal VR 1225 and a feedback signal $U_{FB}$ 1226. As will be further discussed, the feedback signal $U_{FB}$ 1226 can be representative of the output of the first output winding 1207 and the reservoir sense VR 1225, representative of the output of the second output winding 1208. Further, the primary controller 1221 outputs a primary drive signal DR1 1231 that controls the switching of the power switch SP 1206 to control energy delivery from the primary side to the secondary side of the power converter 1200. The secondary controller 1220 outputs a secondary drive signal DR2 that controls the switching of a pass switch S2 1211 to control energy delivery to the output capacitor $C_O$ 1216.

Power converter 1200 provides output power to the load 1217 from an unregulated input voltage $V_{IN}$ 1201, which in one example is a rectified ac line voltage or a rectified and filtered ac line voltage. The input voltage $V_{IN}$ 1201 is coupled to be received by the energy transfer element 1203. The example energy transfer element 1203 shown in FIG. 12 includes three windings, an input winding 1205, a first output winding 1207, and a second output winding 1208. Coupled across the input winding 1205 is the clamp circuit 1202, which limits the maximum voltage across a power switch SP 1206 that is coupled to the primary winding 1205 and an input return 1204 as shown. Primary controller 1221 includes the drive circuit 1230 that provides drive signal DR1 1231 to open and close power switch SP 1206. Drive signal DR1 1231 may be a voltage or current signal. The drive circuit 1230 turns on the power switch SP 1206 in response to a request events in the request signal $U_{REQ}$ 1229 from the secondary controller 1120.

Output rectifier D1 1210 is coupled to the first output winding 1207. A pass switch S2 1211 is coupled to the output rectifier D1 1210 and the output capacitor $C_O$ 1216, and opens and closes in response to secondary drive signal DR2 1224 from the secondary controller 1220 to provide a regulated output voltage $V_O$ 1235, output current $I_O$ 1236, or a combination of the two to the load 1217. In the example of power converter 1200, the output voltage 1235 is positive with respect to an output return 1219, which is galvanically isolated from the input return 1204 by the energy transfer element T1 1203. Secondary drive signal DR2 1124 may be a voltage or a current signal. Resistors R1 and R2 are coupled in series across the output capacitor $C_O$ 1216 and provide the feedback signal $U_{FB}$ 1226 to the secondary controller 1220. As shown, the resistors R1 and R2 form a voltage divider for the output voltage $V_O$ 1235. As such, the feedback signal $U_{FB}$ 1226 is representative of the output voltage $V_O$ 1235, and specifically a scaled version of the output voltage $V_O$ 1235.

Primary controller 1221 and secondary controller 1220 control the power switch SP 1206 such that the input current of the power converter 1200 is proportional to the input voltage $V_{IN}$ 1201 by a factor that is substantially fixed throughout a half line period to maintain power factor. Further, the primary controller 1221 and secondary controller 1220 control the power switch SP 1206 to regulate the output voltage $V_O$ 1235, output current $I_O$ 1236, or a combination of the two. As will be further discussed, the secondary controller 1220 utilizes the feedback signal $U_{FB}$ 1226 and the reservoir sense VR 1225 to determine when to switch the power switch SP 1206. Further, secondary controller 1220 may also utilize a current sense signal $U_{IS}$ 1227 representative of a load current $I_L$ 1237 through load 1217 to determine when to switch the power switch SP 1206. Current sense resistor R3 may be coupled in series to the load 1217 to provide the current sense signal $U_{IS}$ 1227.

When the instantaneous input power of the power converter 1200 exceeds the demand of the load (plus some loss), the secondary controller 1220 switches the pass switch S2 1211 off to prevent the output voltage $V_O$ 1235 from exceeding its desired value. In one example, the secondary controller 1220 compares the feedback signal $U_{FB}$ 1226 to an output voltage reference to determine when to turn on and turn off the pass switch S2 1211. If the feedback signal $U_{FB}$ 1226 exceeds the output voltage reference, the secondary controller 1220 may output the secondary drive signal DR2 1224 to control the pass switch S2 1211 off. If the feedback signal $U_{FB}$ 1226 is less than the output voltage reference, the pass switch S2 1211 is controlled on. When energy is transferred from the input of the power converter 1200 to the output of the power converter 1200, a current is produced in the first output winding 1207 and the second output winding 1208. Energy from the first output winding 1207 is provided to the load 1217 via rectifier 1210 and output capacitor $C_O$ 1216. Energy from the second output winding 1207 is provided to the reservoir capacitor $C_{RES}$ 1212 via rectifier 1209. When regulation has been reached, the pass switch S2 1211 is opened (i.e., off). As shown, the output rectifier D2 1209 and reservoir capacitor $C_{RES}$ 1212 are coupled across the second output winding 1208. The reservoir voltage $V_{RES}$ 1234 is the voltage across reservoir capacitor $C_{RES}$ 1212 and is referenced to the output return 1219. The secondary controller 1220 receives a reservoir sense signal VR 1225 which is representative of the reservoir voltage $V_{RES}$ 1234. In other examples, output rectifier D2 1209 may be a switch driven by secondary controller 1220.

Regulator circuit 1213 is coupled between the reservoir capacitor $C_{RES}$ 1212 and the output capacitor $C_O$ 1216. Regulator circuit 1213 may be a non-isolated power converter, such as a boost or buck-boost converter. When the instantaneous input power is less than the demand of the load 1217 plus the loss in the power conversion circuits, regulator circuit 1213 receives current from the reservoir capacitor $C_{RES}$ 1212 to supplement the energy delivered to the load 1217. In one example, the reservoir voltage $V_{RES}$ 1234 increases when the energy transfer element T1 1203 is delivering more energy to the output of the power converter (i.e., load 1217) than needed. The reservoir voltage $V_{RES}$ 1234 is substantially constant when the energy transfer element T1 1203 is delivering the energy needed to the output of the power converter and the reservoir voltage $V_{RES}$ 1234 decreases when the energy transfer element T1 1203 is not delivering the energy needed. In other words, the reservoir voltage $V_{RES}$ 1234 decreases when the regulator circuit 1213 is pulling current from the reservoir capacitor $C_{RES}$ 1212. As such, the reservoir sense signal VR 1225 representative of the reservoir voltage $C_{RES}$ 1234 is also representative of the amount of energy delivered to output of the power converter 1200.

Secondary controller 1220 is shown as receiving the reservoir sense signal VR 1225, feedback signal $U_{FB}$ 1226, and current sense signal $U_{IS}$ 1227. The secondary controller 1220 outputs the secondary drive signal DR2 1224 and may also output a control signal for the regulator circuit 1213 (not shown). The request control circuit 1222 is shown to receive reservoir sense signal, the feedback signal, and a current sense signal. The request control circuit 1222 outputs a request signal $U_{REQ}$ 1229, and a secondary drive signal DR2.

As mentioned previously, the request control circuit 1222 is coupled to generate the request signal $U_{REQ}$ 1229 in response to the feedback signal $U_{FB}$ 1226. The request signal $U_{REQ}$ 1226 can include a single pulse. However, the request signal $U_{REQ}$ 1229 can be appended with a synchronization signal when a jitter average signal (not shown in FIG. 12) is received The synchronization signal corresponds to an average on time for the power switch 1206.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
    a request control circuit configured to generate a request signal in response to a feedback signal representative of an output of the power converter for controlling a power switch, the request control circuit comprising:
        a jitter generator configured to generate a jitter signal, wherein the jitter signal is modified in response to a jitter count signal and a current signal; and wherein the request signal comprises a synchronization signal representative of an average on time for controlling the power switch in response to the feedback signal and a jitter average signal.

2. The controller of claim 1, the request control circuit further comprising:
    a control circuit configured to generate a target signal representative of a desired output of the power converter in response to the feedback signal;
    a regulation circuit configured to generate a count signal in response to the target signal;
    a digital-to-analog converter (DAC) coupled to receive the count signal, the DAC configured to generate the current signal representative of the count signal;
    an oscillator configured to generate a frequency signal in response to the jitter signal; and
    a request transmitter configured to generate the request signal in response to the frequency signal.

3. The controller of claim 2, the request transmitter circuit further configured to generate the synchronization signal in response to the jitter average signal.

4. The controller of claim 2, wherein the frequency signal is modulated in response to the jitter signal.

5. The controller of claim 2, the regulation circuit comprising:
   a jitter counter coupled to increment and decrement the jitter count signal in response to a direction signal, wherein the jitter counter outputs the jitter average signal in response to the output of the jitter counter at a median value of the jitter count signal;
   a minimum and maximum circuit configured to generate a first state of the direction signal until the jitter count signal reaches a maximum value of the jitter count signal, the minimum and maximum circuit further configured to generate a second state of the direction signal until the jitter count signal reaches a minimum value of the jitter count signal; and
   a counter coupled to increment and decrement the count signal in response to the target signal and a clock signal.

6. The controller of claim 1, the jitter generator comprising:
   a first transistor coupled to a reference current source;
   a plurality of transistors coupled to the first transistor, wherein the plurality of transistors are controlled in response to the jitter count signal; and
   a second transistor coupled to the first transistor and the plurality of transistors, wherein the second transistor generates the jitter signal.

7. The controller of claim 1, wherein the request signal is transmitted from a secondary controller to a primary controller.

8. The controller of claim 7, wherein the secondary controller and primary controller are galvanically isolated from each other.

9. The controller of claim 7, the primary controller comprising a drive circuit for controlling the power switch.

10. The controller of claim 9, wherein the average on time is updated every switching cycle in response to an absence of the synchronization signal after a time period.

11. The controller of claim 9, the drive circuit comprising:
    a pattern detection circuit coupled to receive the request signal, the pattern detection circuit configured to generate a pattern detection signal in response to a detection of a plurality of pulses;
    a non-overlapping clock generator configured to generate a first non-overlapping signal and a second non-overlapping clock signal in response to the pattern detection signal;
    a plurality of switches coupled to be controlled by the first non-overlapping clock signal and second non-overlapping clock signal; and
    a current source coupled to charge a first capacitor and a second capacitor in response to a state of operation of the plurality of switches.

12. The controller of claim 11, wherein the drive circuit further comprising:
    a timer circuit coupled to receive the pattern detection signal to reset a time period, the timer circuit configured to generate an expiration signal in response to an expiration of the time period;
    a voltage to current converter configured to generate a current for charging a third capacitor in response to a stored frequency signal representative of the average on time; and
    a comparator configured to drive the power switch in response to the voltage across the capacitor and a voltage reference.

13. The controller of claim 12, the drive circuit further comprising a switch that is controlled to update the stored frequency signal.

14. The controller of claim 13, wherein the switch is closed in response to the expiration signal.

15. The controller of claim 13, the drive circuit further comprising a voltage comparison circuit configured to generate a forced update signal in response to the stored frequency signal and an instant frequency signal in response to the instant frequency signal greater than or less than a percentage of the stored frequency signal.

16. The controller of claim 13, wherein the switch is closed in response to a forced updated signal.

17. The controller of claim 13, wherein the switch is closed in response to the pattern detection signal.

18. The controller of claim 15, the voltage comparison circuit comprising:
    an operational amplifier configured to generate a second voltage reference and a third voltage reference in response to the stored frequency signal,
    a first comparator coupled to receive the second voltage reference and the instant frequency signal;
    a second comparator coupled to receive the third voltage reference and the instant frequency signal;
    a first logic gate coupled to an output of the first comparator;
    a second logic gate coupled an output of the second comparator;
    a counter circuit coupled to count in response to the first logic gate, the counter circuit configured to reset in response to the second logic gate; and
    a threshold detection circuit configured to generate a force update signal in response to a detection of when a counter circuit output is above a threshold.

19. A power converter comprising:
    a secondary controller configured to generate a request signal for controlling a power switch in response to a feedback signal representative of an output of the power converter, wherein the request signal comprises a synchronization signal representative of an average on time for controlling the power switch in response to the feedback signal and a jitter average signal; and
    a primary controller configured to generate a primary drive signal in response to the request signal, wherein the primary drive signal is coupled to control switching of the power switch to control a transfer of energy from an input of the power converter to the output of the power converter.

20. The power converter of claim 19, the secondary controller comprising a request control circuit configured to generate the request signal in response to the feedback signal.

21. The power converter of claim 20, the request control circuit comprising:
    a jitter generator configured to generate a jitter signal in response to a current signal, wherein the jitter signal is modified in response to a jitter count signal.

22. The power converter of claim 19, wherein the input of the power converter is galvanically isolated from the output of the power converter, and wherein the primary controller is galvanically isolated from the secondary controller.

23. The power converter of claim 22, wherein the primary controller is coupled to receive the request signal from the secondary controller through a communication link.

24. The power converter of claim 19, the primary controller comprising a drive circuit for controlling the power switch.

25. The power converter of claim 19, wherein the average on time is updated every switching cycle in response to an absence of the synchronization signal after a time period.

26. The power converter of claim 24, the drive circuit comprising:
a pattern detection circuit coupled to receive the request signal, the pattern detection circuit configured to generate a pattern detection signal in response to a detection of a plurality of pulses;
a non-overlapping clock generator configured to generate a first non-overlapping signal and a second non-overlapping clock signal in response to the pattern detection signal;
a plurality of switches coupled to be controlled by the first non-overlapping clock signal and the second non-overlapping clock signal; and
a current source coupled to charge a first capacitor and a second capacitor in response to a state of operation of the plurality of switches.

27. The power converter of claim 26, wherein the drive circuit further comprises:
a timer circuit coupled to receive the pattern detection signal to reset a time period, the timer circuit configured to generate an expiration signal in response to an expiration of the time period;
a voltage to current converter configured to generate a current for charging a third capacitor in response to a stored frequency signal representative of the average on time; and
a comparator configured to drive the power switch in response to the voltage across the capacitor and a voltage reference.

28. The power converter of claim 27, the drive circuit further comprising a switch that is controlled to update the stored frequency signal.

29. The power converter of claim 28, wherein the switch is closed in response to the expiration signal.

30. The power converter of claim 27, the drive circuit further comprising a voltage comparison circuit configured to generate a forced update signal in response to the stored frequency signal and an instant frequency signal to determine if the instant frequency signal is greater than or less than a percentage of the stored frequency signal.

31. The power converter of claim 28, wherein the switch is closed in response to a forced updated signal.

32. The power converter of claim 28, wherein the switch is closed in response to the pattern detection signal.

33. The power converter of claim 30, the voltage comparison circuit comprising:
an operational amplifier configured to generate a second voltage reference and a third voltage reference in response to the stored frequency signal,
a first comparator coupled to receive the second voltage reference and the instant frequency signal;
a second comparator coupled to receive the third voltage reference and the instant frequency signal;
a first logic gate coupled to an output of the first comparator;
a second logic gate coupled an output of the second comparator;
a counter circuit coupled to count in response to the first logic gate, wherein the counter circuit is further coupled to reset in response to the second logic gate; and
a threshold detection circuit configured to generate the forced update signal in response to a detection of when a counter circuit output above a threshold.

* * * * *